US007275208B2

(12) United States Patent
Uramoto et al.

(10) Patent No.: US 7,275,208 B2
(45) Date of Patent: Sep. 25, 2007

(54) XML DOCUMENT PROCESSING FOR ASCERTAINING MATCH OF A STRUCTURE TYPE DEFINITION

(75) Inventors: Naohiko Uramoto, Yokohama (JP); Hiroshi Maruyama, Tokyo (JP); Kento Tamura, Machida (JP)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 10/370,196

(22) Filed: Feb. 20, 2003

(65) Prior Publication Data

US 2003/0229852 A1  Dec. 11, 2003

(30) Foreign Application Priority Data

Feb. 21, 2002  (JP)  .............................. 2002-045087

(51) Int. Cl.
  *G06F 15/00*  (2006.01)
(52) U.S. Cl. ........................ 715/513; 715/500; 707/100
(58) Field of Classification Search ................ 715/513, 715/500; 706/46; 707/100
See application file for complete search history.

(56) References Cited

U.S. PATENT DOCUMENTS

| | | | | |
|---|---|---|---|---|
| 6,006,242 A * | 12/1999 | Poole et al. | ................. | 715/531 |
| 6,014,680 A * | 1/2000 | Sato et al. | ................... | 715/513 |
| 6,021,202 A * | 2/2000 | Anderson et al. | ........... | 713/176 |
| 6,108,676 A * | 8/2000 | Nakatsuyama | ............... | 715/522 |
| 6,330,574 B1 * | 12/2001 | Murashita | .................... | 715/513 |
| 6,569,207 B1 * | 5/2003 | Sundaresan | ................. | 715/513 |
| 6,718,333 B1 * | 4/2004 | Matsuda | ..................... | 707/102 |
| 6,950,984 B2 * | 9/2005 | Hori et al. | .................. | 715/513 |
| 6,963,920 B1 * | 11/2005 | Hohmann et al. | .......... | 709/230 |
| 2001/0014899 A1 * | 8/2001 | Fujikawa | .................... | 707/513 |
| 2001/0020238 A1 * | 9/2001 | Tsuda | ............................. | 707/5 |
| 2002/0143818 A1 * | 10/2002 | Roberts et al. | ............. | 707/513 |
| 2002/0147747 A1 * | 10/2002 | Zaharkin | ..................... | 707/513 |
| 2003/0050931 A1 * | 3/2003 | Harman et al. | ............. | 707/100 |
| 2003/0074636 A1 * | 4/2003 | Manepalli | ................... | 715/513 |
| 2004/0205656 A1 * | 10/2004 | Reulein et al. | ............. | 715/530 |
| 2005/0204275 A2 * | 9/2005 | Schumacher et al. | ....... | 715/500 |

OTHER PUBLICATIONS

"Spyglass HTML validator", hereinafter Spyglass, copyright 1996, pp. 1-7.*
Gary Houston, "Running gf", pp. 1-2, published Aug. 1994.*

* cited by examiner

*Primary Examiner*—Stephen Hong
*Assistant Examiner*—Thu V. Huynh
(74) *Attorney, Agent, or Firm*—Louis P. Herzberg

(57) ABSTRACT

To perform processing at a high speed to identify some of the structure type definitions in a given definition set to which a received XML document matches. There are provided a decision rule generation section which generates a decision rule for determining to which one of a plurality of DTDs an XML document matches on the basis of unique elements of the DTDs, and a DTD determination section which determines to which one of the plurality of DTDs the XML document to be processed matches on the basis of the decision rule generated by the decision rule generation section.

11 Claims, 21 Drawing Sheets

Fig. 5

```
<!---- D1.dtd -->
<!ELEMENT A, (B, C, D)>
<!ELEMENT B (#PCDATA)>
<!ELEMENT C (#PCDATA)>
<!ELEMENT D (#PCDATA)>
```

```
<!---- D2.dtd -->
<!ELEMENT A, (B, C, E)>
<!ELEMENT B (#PCDATA)>
<!ELEMENT C (#PCDATA)>
<!ELEMENT E (#PCDATA)>
```

```
<!---- D3.dtd -->
<!ELEMENT A, (G*, B, D)>
<!ELEMENT B (#PCDATA)>
<!ELEMENT D (#PCDATA)>
<!ELEMENT G (#PCDATA)>
```

```
<!---- D4.dtd -->
<!ELEMENT A, (F, H, G?)>
<!ELEMENT F (#PCDATA)>
<!ELEMENT G (#PCDATA)>
<!ELEMENT H (#PCDATA)>
```

Fig. 6

```
<A>
  <B>ThinkPad X21</B>
  <C>LEASE
  <E>ONE
</A>
```

Fig. 7

```
<A>
  <B>ThinkPad X21</B>
  <D>ONE
</A>
```

Fig. 8

| RULE | DTD NAME |
|------|----------|
| (A)  | D1, D2, D3, D4 |
| (B)  | D1, D2, D3 |
| (C)  | D1, D2 |
| (D)  | D1, D3 |
| (E)  | D2 |
| (F)  | D4 |
| (G)  | D3, D4 |
| (H)  | D4 |

Fig. 9

```
Rule-D1 = {}.
Rule-D2 = {(E)}.
Rule-D3 = {}.
Rule-D4 = {(F, H)}.
(Rule-Dn is rule set for determination of DTD Dn)
```

Fig. 10

| RULE | DTD NAME |
|---|---|
| (B, C) | D1, D2 |
| (C, D) | D1 |
| (C, E) | D2 |
| (G*, B) | D3 |
| (B, D) | D3 |
| (F, H) | D4 |
| (H, G?) | D4 |

Fig. 11

```
Rule-D1 = { (C, D) },
Rule-D2 = { (E), (C, E) },
Rule-D3 = { (G*, B), (B, D) },
Rule-D4 = { (F), (H), (F, H), (H, G?) },
(Rule-Dn is rule set for determination of DTD Dn)
```

Fig. 12

```
Rule-D1 = { (C, D) },
Rule-D2 = { (E), ~~(C, E)~~ },
Rule-D3 = { ~~(G*, B)~~, (B, D) },
Rule-D4 = { (F), ~~(H)~~, ~~(F, H)~~, ~~(H, G?)~~ },
(Rule-Dn is rule set for determination of DTD Dn)
```

Fig. 15

```
D5 <!ELEMENT A (B, C, D)>
D6 <!ELEMENT A (B, C, E)>
D7 <!ELEMENT A (G*, B, D)>
```

Fig. 18

PARTIAL CONSTRUCTION ALGORITHM USING BIT VECTOR COMPUTATION
Set state ε-closure(q0) in stack Dstates without being marked //①
while (unmarked state T exists in Dstates) do begin //②
 Mark T
 for (each input symbol) do begin
  U: = ε-closure(move(T, a)) //③
  if U is not in Dstates begin
   Add U in unmarked state to Dstates
  Dtran[T, a]: = U
   Set as bit vector for DTran[T, a] the sum (or) of bit vectors of rules for transitions from a to states in T
 end
end

Fig. 23

PARTIAL CONSTRUCTION ALGORITHM USING BIT VECTOR COMPUTATION
Set state ε-closureWB(q0) in stack Dstates without being marked //①
while (unmarked state T exists in Dstates) do begin //②
  Mark T
  for (each input symbol) do begin
    U: = ε-closureWB(move(T, a)) //③
    if U is not in Dstates begin
      Add U in unmarked state to Dstates
    end
  end

XML DOCUMENT PROCESSING FOR ASCERTAINING MATCH OF A STRUCTURE TYPE DEFINITION

FIELD OF THE INVENTION

The present invention is directed to processing a document described in a structured language such as the extensible markup language (XML). More particularly it is directed to determining which of a plurality of prepared structure type definitions a document to be processed matches.

BACKGROUND ART

In the field of information communication through networks, systems in which data, etc., are exchanged by using XML formats are becoming prevalent. Ordinarily, not a single XML document format but a plurality of XML document formats exist as the format of XML documents exchanged as business data, etc., between companies. For example, with respect to a leasing contract system, formats for a quotation request, a contract document, a request item inquiry, etc., are conceivable.

In XML, a format is designated by using a DTD. More specifically, DTD files such as a quotation DTD and a contract DTD are respectively prepared for formats. Although it is technically possible to write a plurality of formats by one DTD but in actuality different DTDs are ordinarily used for a plurality of formats.

In some case, there is a need to recognize the format of an XML document by identifying a DTD to which the XML document matches. For example, in a case where processing according to the contents of a transferred XML document is performed on the XML document, a key for an electronic signature is used according to the format. In such a case, if a DTD has been explicitly designated for the XML document to be processed, it is apparent that the DTD to which the XML document matches can be identified. However, if no explicit designation has been made, processing for actually verifying the XML document with respect to DTDs is required.

In some case, no DTD is designated for XML document. For example, no DTD can be designated in a situation described below. In recent years, system construction through Web services has been spotlighted and such Web services use a simple object access protocol (SOAP) for exchange of XML documents. The SOAP specification functions as an envelop containing an XML document. That is, an XML document is transferred by being wrapped in a SOAP envelop in accordance with a SOAP. A SOAP uses not a DTD but an XML schema as a structure type definition (schema). Therefore, even if an XML document contained in a SOAP envelop matches a predetermined DTD, it is not possible to designate the DTD for the XML document by DOCTYPE declaration. Also in the case of an XML document with an electronic signature, a DTD cannot be designated for the XML document due to the same mechanism.

As described above, if there is a need to identify a DTD for an XML document, and if no DTD is explicitly designated for the XML document to be processed, processing for actually verifying the XML document with respect to DTDs is required to identify a DTD for the XML document.

In the case of an XML document processed in accordance with a SOAP or by processing with an electronic signature, a DTD for this XML document cannot be designated by DOCTYPE declaration. Therefore, processing for actually verifying the XML document with respect to DTDs is also required to identify a DTD for the XML document. In this case, to enable identification of the DTD for the XML document in a processed state, the DTD for the XML document may be described in a SOAP header or the like. However, there is no standard method for designating a DTD.

As described, it is necessary in some case to perform processing for verification with respect to DTDs for recognition of the format of an XML document to be processed. In a case where an XML document to be processed has a multiplicity of formats, however, a process for verifying the XML document with respect to all DTDs is troublesome and time-consuming. The same problem is also encountered with a structure type definition (e.g., the above-mentioned XML schema) other than DTDs.

SUMMARY OF THE INVENTION

Therefore an aspect of the present invention is, assuming that a set of a structure type definitions are given, to enable processing for ascertaining to which one of the structure type definitions a received XML document matches be performed at a high speed.

Another aspect of the present invention is to realize a system for performing such processing with no influence on existing system configurations and implementations of XML processors.

In an example embodiment to achieve these aspects, the present invention is realized as a document processing system constructed as described below. The document processing system has a decision rule generation section for generating a decision rule for determining whether a document described in a structured language such as XML matches at least one of a plurality of structure type definitions (e.g., DTDs) on the basis of unique elements of the structure type definitions, and a determination section for determining whether the document to be processed matches at least one of the structure type definitions on the basis of the decision rule generated by the decision rule generation section.

Another example embodiment of a document processing system in accordance with the present invention has an input section for inputting an XML document to be processed, an XML parser for analyzing the XML document input by the input section, and a DTD (Document Type Definition) determination section for determining at least one of a group of DTDs to which the XML document matches by determination as to whether or not an element unique to the DTD is included in the XML document on the basis of the result of analysis by the XML parser.

Still another document processing system in accordance with the present invention has a nondeterministic finite state automaton generation section for generating a nondeterministic finite state automaton corresponding to a group of structure type definitions (e.g., DTDs) to at least one of which a document described in a structured language such as XML should match, a deterministic finite state automaton generation section by converting the nondeterministic finite state automaton generated by the nondeterministic finite state automaton generation section to a deterministic finite state automaton, and a determination section for determining on the basis of the deterministic finite state automaton generated by the determinative automaton generation section whether the document to be processed matches at least one of the group of structural type definitions.

The present invention is also realized as a document processing method for processing a document described in a structured language such as XML by using a computer. That is, this document processing method includes the step of generating a decision rule for determining whether a document to be processed matches at least one of a plurality of structure type definitions (e.g., DTDs) on the basis of unique elements of the structure type definitions, and the step of determining whether the document to be processed matches at least one of the structure type definitions on the basis of the generated decision rule.

Another document processing method in accordance with the present invention includes the step of inputting and analyzing the XML document and examining whether or not an element unique to any one of a group of DTDs (Document Type Definitions) to at least one of which the XML document to be processed should match is included in the XML document based on the result of the analysis, and identifying the DTD to which the XML document matches.

Still another document processing method in accordance with the present invention includes a first group of steps of reading out from a memory a group of structure type definitions to at least one of which the document should match and generating a first nondeterministic finite state automaton corresponding to each of structure type definitions included in the group of structural type definitions, a second group of steps of combining the first nondeterministic finite state automatons into a second nondeterministic finite state automaton corresponding to the whole of the group of structural type definitions, a third group of steps of converting the second nondeterministic finite state automaton into a deterministic finite state automaton, and a fourth group of steps of determining whether the document to be processed matches at least one of the group of structural type definitions on the basis of the deterministic finite state automaton.

Also, the present invention may be realized as a program for realizing the above-described document processing system by using a computer or making a computer execute processes corresponding to the steps in the document processing method. This program may be provided by being distributed for example in a state of being stored in a magnetic disk, an optical disk, a semiconductor memory or any other recording medium or distributed over a network.

BRIEF DESCRIPTION OF THE DRAWINGS

FIG. 5 is a diagram showing an example of DTDs;

FIG. 6 is a diagram showing an example of an XML document to be processed;

FIG. 7 is a diagram showing another example of the XML document to be processed;

FIG. 8 is a diagram showing an index of rules each formed of one element and relating to the DTDs shown in FIG. 5;

FIG. 9 is a diagram showing decision rules obtained from the index of FIG. 8;

FIG. 10 is a diagram showing an index formed by adding rules each formed of two elements to the index of FIG. 8;

FIG. 11 is a diagram showing an index formed by reflecting in FIG. 9 decision rules obtained from the index of FIG. 10;

FIG. 12 is a diagram showing a state where the decision rules shown in FIG. 11 are narrowed down;

FIG. 15 is a diagram showing an example of DTDs;

FIG. 18 is a diagram showing an algorithm extended in accordance with the embodiment in a case where a DFA is generated by using a partial construction method;

FIG. 23 is a diagram showing an algorithm extended in accordance with an example of modification of the embodiment in a case where a DFA is generated by using a partial construction method;

DESCRIPTION OF SYMBOLS

Figure 1:
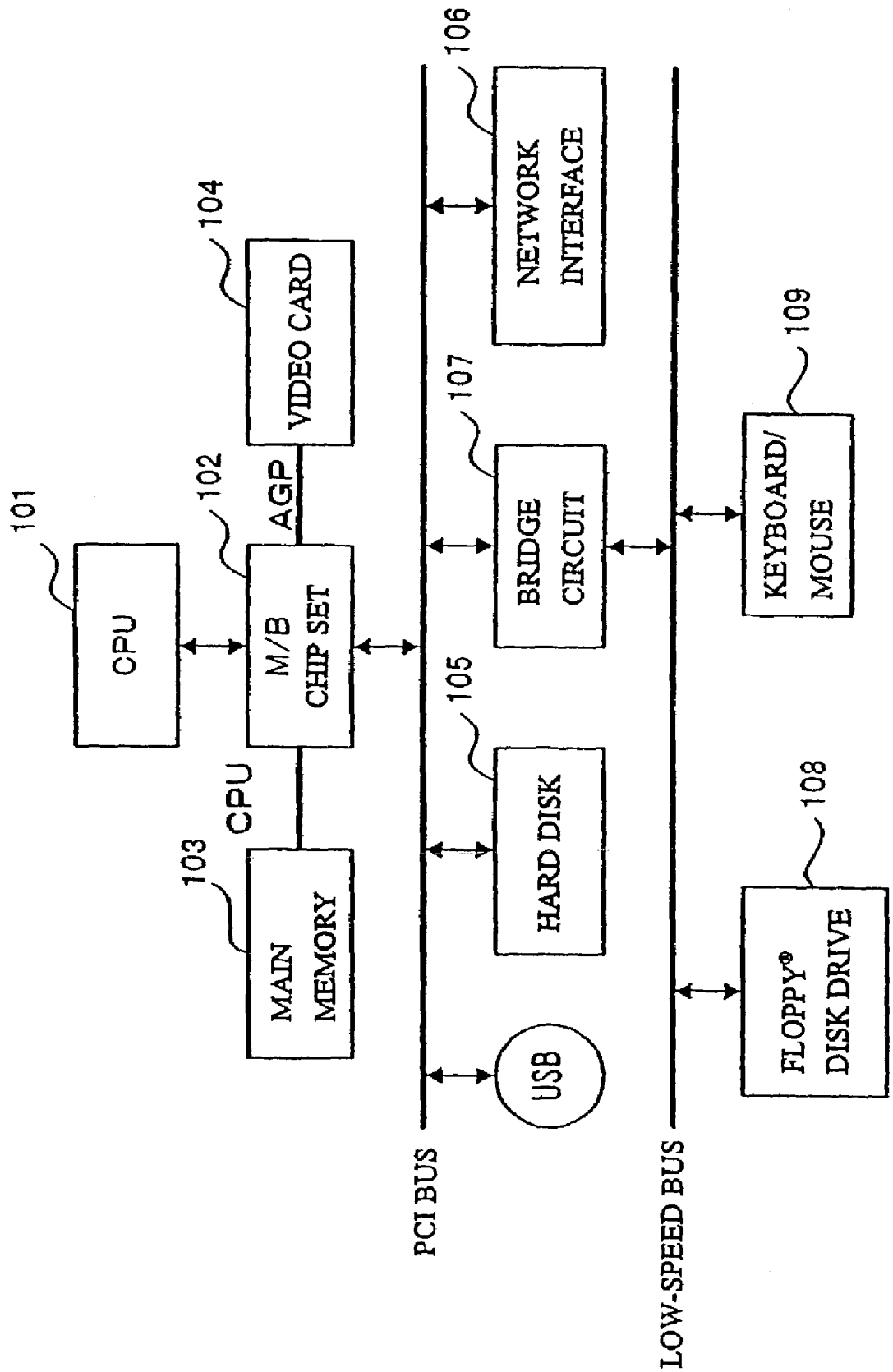
FIG. 1 is a diagram schematically showing an example of a hardware configuration of a computer suitable for implementation of an XML document determination system in accordance with a first embodiment of the present invention.

10 . . . decision rule generation section
20 . . . decision rule base storage section
30 . . . DTD storage section
40 . . . XML parser
50 . . . DTD determination section
101 . . . Central processing unit. (CPU)
102 . . . M/B (mother board) chip set
103 . . . Main memory
105 . . . Hard disk
1410 . . . DTD storage section
1420 . . . NFA generation section
1430 . . . DFA generation section
1450 . . . XML verification section

DESCRIPTION OF THE INVENTION

The present invention enables processing for ascertaining to which structure type definition a received XML document matches be performed at a high speed. It also provides a system for performing such processing with no influence on existing system configurations and implementation of XML processors.

The present invention is realized as a document processing system in which the document processing system has a decision rule generation section for generating a decision rule for determining whether a document described in a structured language such as XML matches at least one of a plurality of structure type definitions (e.g., DTDs) on the basis of unique elements of the structure type definitions, and a determination section for determining whether the document to be processed matches at least one of the structure type definitions on the basis of the decision rule generated by the decision rule generation section.

More specifically, the decision rule generation section forms a rule base for identifying the corresponding structure type definition by using the decision rule on condition that a predetermined element occurs, and the determination section identifies the structure type definition to which the document to be processed matches by collating a sequence of events obtained from the document with the rule base.

Another embodiment of a document processing system in accordance with the present invention has an input section for inputting an XML document to be processed, an XML parser for analyzing the XML document input by the input section, and a DTD (Document Type Definition) determination section for determining at least one of a group of DTDs to which the XML document matches by determination as to whether or not an element unique to the DTD is included in the XML document on the basis of the result of analysis by the XML parser.

Still another document processing system in accordance with the present invention has a nondeterministic finite state automaton generation section for generating a nondeterministic finite state automaton corresponding to a group of structure type definitions (e.g., DTDs) to at least one of which a document described in a structured language such as XML should match, a deterministic finite state automaton generation section by converting the nondeterministic finite state automaton generated by the nondeterministic finite state automaton generation section to a deterministic finite state automaton, and a determination section for determining on the basis of the deterministic finite state automaton generated by the determinative automaton generation section whether the document to be processed matches at least one of the group of structural type definitions.

In this document processing system, particular information for identification for portions corresponding to the structure type definitions included in the group of structure type definitions is imparted to the generated automaton. That is, the nondeterministic finite state automaton generation section generates the nondeterministic finite state automaton corresponding to the group of structure type definitions by combining nondeterministic finite state automatons corresponding to the structure type definitions included in the group of structure type definitions, and imparts particular information designating the corresponding structure type definition to the portions corresponding to the structure type definitions in the nondeterministic finite state automaton corresponding to the group of structure type definitions. The deterministic finite state automaton generation section imparts to the generated deterministic finite state automaton the particular information imparted to the nondeterministic finite state automaton after updating the particular information. The determination section traces the determinative finite state automaton on the basis of the document to be processed, and identifies the structure type definition to which the document matches on the basis of the particular information imparted to the traced portion.

As the particular information, a bit vector having a number of bits corresponding to the number of structured languages may be used. In such a case, if the bits in the bit vector are respectively related to the structured languages, the bit vector imparted to each of the predetermined portions of the automaton may be referred to recognize the corresponding structured language. This particular information may be imparted to state transitions or states in the nondeterministic finite state automaton and the deterministic finite state automaton.

The present invention is also realized as a document processing method for processing a document described in a structured language such as XML by using a computer. In an example embodiment the document processing method includes the step of generating a decision rule for determining whether a document to be processed matches at least one of a plurality of structure type definitions (e.g., DTDs) on the basis of unique elements of the structure type definitions, and determining whether the document to be processed matches at least one of the structure type definitions on the basis of the generated decision rule. More specifically, the step of generating the decision rule includes the step of extracting a sequence of elements constituting each of the structure type definitions, and the step of selecting, as a decision rule, each of the extracted sequence of elements which occurs in only one of the structure type definitions.

Another document processing method in accordance with the present invention includes the step of inputting and analyzing the XML document and examining whether or not an element unique to any one of a group of DTDs (Document Type Definitions) to at least one of which the XML document to be processed should match is included in the XML document based on the result of the analysis, and identifying the DTD to which the XML document matches.

Still another document processing method in accordance with the present invention includes a first group of steps of reading out from a memory a group of structure type definitions to at least one of which the document should match and generating a first nondeterministic finite state automaton corresponding to each of structure type definitions included in the group of structural type definitions, a second group of steps of combining the first nondeterministic finite state automatons into a second nondeterministic finite state automaton corresponding to the whole of the group of structural type definitions, a third group of steps of converting the second nondeterministic finite state automaton into a deterministic finite state automaton, and a fourth group of steps of determining whether the document to be processed matches at least one of the group of structural type definitions on the basis of the deterministic finite state automaton.

Preferably, particular information for identification for portions corresponding to the structure type definitions included in the group of structure type definitions is imparted to the automaton when the automaton is generated. That is, the first group of steps includes a step of imparting, to each of the first nondeterministic finite state automatons, particular information designating the corresponding structure type definition, the second group of steps includes a step of imparting the particular information to the portions corresponding to the structure type definition in the second nondeterministic finite state automatons, the third group of steps includes a step of imparting to the generated deterministic finite state automaton the particular information imparted to the nondeterministic finite state automaton after updating the particular information, and the fourth group of steps includes a step of tracing the determinative finite state automaton on the basis of the document to be processed, and identifying the structure type definition to which the document matches on the basis of the particular information imparted to the traced portion.

Also, the present invention may be realized as a program for realizing the above-described document processing system by using a computer or making a computer to execute processings corresponding to the steps in the document processing method. This program may be provided by being distributed in a state of being stored in a magnetic disk, an optical disk, a semiconductor memory or any other recording medium or distributed over a network.

The present invention will be described in detail with respect to first and second embodiments thereof with reference to the accompanying drawings. While each embodiment of the present invention is described below with respect to a case where XML document structure type definitions (schema) are DTDs, the same method can also be applied to processing on other structure type definitions.

FIRST EMBODIMENT

In the first embodiment, a set of DTDs some of which is probable to correspond to an XML document to be handled are scanned in advance to generate a discrimination rule for discrimination of each of the DTDs from the others. Each discrimination rule is used for discrimination of the corresponding DTD when an XML document matches the DTD, thereby enabling the DTD to which the XML document matches be identified with efficiency.

FIG. 1 is a diagram schematically snowing an example of a hardware configuration of a computer suitable for implementation of an XML document determination system in accordance with the first embodiment of the present invention.

The computer shown in FIG. 1 has a central processing unit (CPU) 101, which is a computation means, a main memory 103 connected to the CPU 101 via a mother board (M/B) chip set 102 and a CPU bus, a video card 104 also connected to the CPU 101 via the M/B chip set 102 and an accelerated graphic port (AGP), a hard disk 105 and a network interface 106 each connected to the M/B chip set 102 via a peripheral component interconnect (PCI) bus, and a floppy disk drive 108 and a keyboard/mouse 109 each connected to the M/B chip set 102 via the PCI bus, a bridge circuit 107 and a low-speed bus such as an industry standard architecture (ISA) bus. This computer has a clock oscillator and a controller for controlling the clock oscillator (both not shown) provided as means for controlling the operating performance (operating clock) of the CPU 101 as described below.

FIG. 1 only illustrates an example of the hardware configuration of the computer for implementation of this embodiment, and the computer may have any of other various configurations if this embodiment can be applied to it. For example, only a video memory may be provided in place of the video card 104 and image data may be processed by the CPU 101 alone. A sound mechanism for speech input/output may be provided. Also, a compact disc-read only memory (CD-ROM) drive and a digital versatile disc-read only memory (DVD-ROM) drive may be provided by means of an interface such as an AT attachment (ATA).

Figure 2:
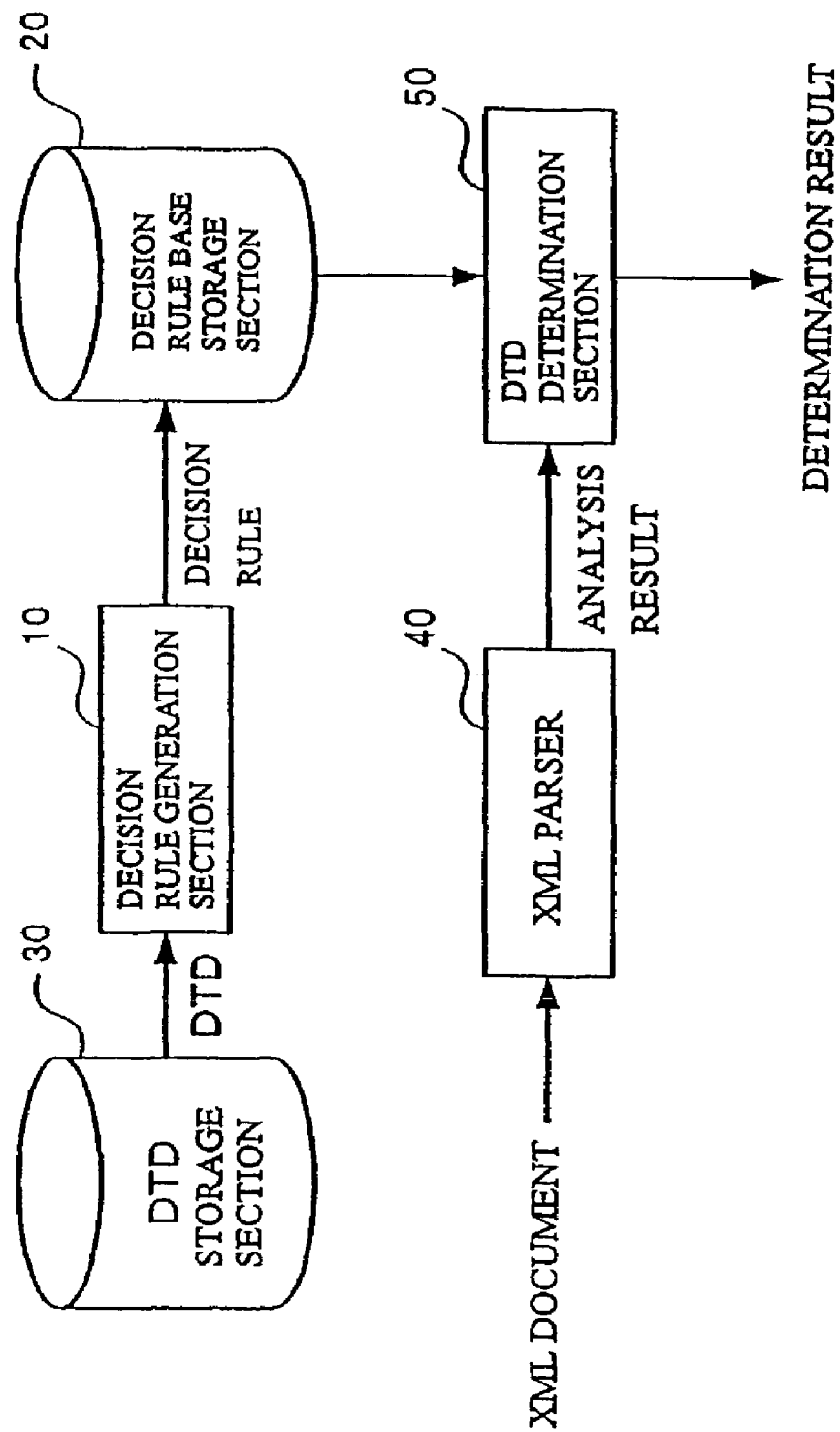
FIG. 2 is a block diagram for explaining the configuration of the XML document determination system in accordance with the first embodiment.

FIG. 2 is a block diagram for explaining the configuration of the XML document determination system in accordance with the first embodiment of the present invention. Referring to FIG. 2, the XML document determination system of the first embodiment has a decision rule generation section 10 which generates, by scanning a set of a plurality of DTDs, a decision rule for determining to which of the DTDs an XML document matches, a decision rule base storage section 20 which generates a rule base (decision rule base) from the set of decision rules generated by the decision rule generation section 10 and stores the rule base, a DTD storage section 30 in which the set of DTDs to some of which an XML document to be handled should match is stored, an XML parser 40 for analyzing an XML document (input document) to be processed, and a DTD determination section 50 which determines to which one of the DTDs an XML document analyzed by the XML parser 40 matches by collating the decision rules in the decision rule base. The XML document determination system also has an input section (not shown) to which XML documents (input documents) to be processed after being analyzed by the XML parser 40 are input via a network or a predetermined input device, and through which the input documents are stored in a main memory 103 or the like.

In the system configuration shown in FIG. 2, the decision rule generation section 10, the XML parser 40 and the DTD determination section 50 are software blocks realized by using the program-controlled CPU 101 shown in FIG. 1. A program for realizing these functions by controlling the CPU 101 is provided by being distributed in a state of being stored in a magnetic disk, an optical disk, a semiconductor memory or any other recording medium or distributed over a network, and is stored in the main memory 103. Also, the decision rule base storage section 20 and the DTD storage section 30 are realized in the main memory 103. Data stored in the main memory 103 can be saved to a storage, e.g., the hard disk 150 if necessary.

Processing in this embodiment is broadly divided into decision rule generation processing by the decision rule generation section 10 and XML document determination processing performed by using the XML parser 40 and the DTD determination section 50. Therefore the system shown in FIG. 2 may be such that the decision rule generation section 10, the XML parser 40 and the DTD determination section 50 are realized by using one computer, or such that, for example, the decision rule generation section 10 is realized by using one computer and the XML parser 40 and the DTD determination section 50 are realized by using another computer. In the latter case, the decision rule base is delivered from the computer operating as the decision rule generation section 10 to the computer operating as the XML parser 40 and the DTD determination section 50 by means of a network or a recording medium such as a magnetic disk. Also, the decision rule base storage section 20 and DTD storage section 30 are provided in combination with each computer.

The functions of the XML document determination system shown in FIG. 2 will now be described in detail. An input to the XML document determination system of this embodiment is an XML document having no DTD information, and an output from the XML document determination system is a DTD to which the input XML document matches. If an XML document matches a plurality of DTDs, the corresponding DTDs are output. Matching of a given XML document to Dn.dtd which is a predetermined DTD indicates that the result of verification of the XML document with Dn.dtd assumed to be designated is "valid".

The method of determining a DTD for an XML document in this embodiment is based on the idea that if an element (sequence) defined as an indispensable element in a predetermined DTD does not occur in other DTDs (that is, the DTD has an element (sequence) specific to it), the DTD to which this XML document matches can be uniquely determined at the stage when it is confirmed that the element occurs in the given XML document. That is, an (indispensable) element or a sequence of elements which exists only in a certain DTD is found from a set of DTDs and a set of rules for determination is constructed, thereby enabling a DTD to which an XML document matches be determined at a high speed. The decision rule generation section 10 first generates decision rules on the basis of the above-described idea.

Figure 3:
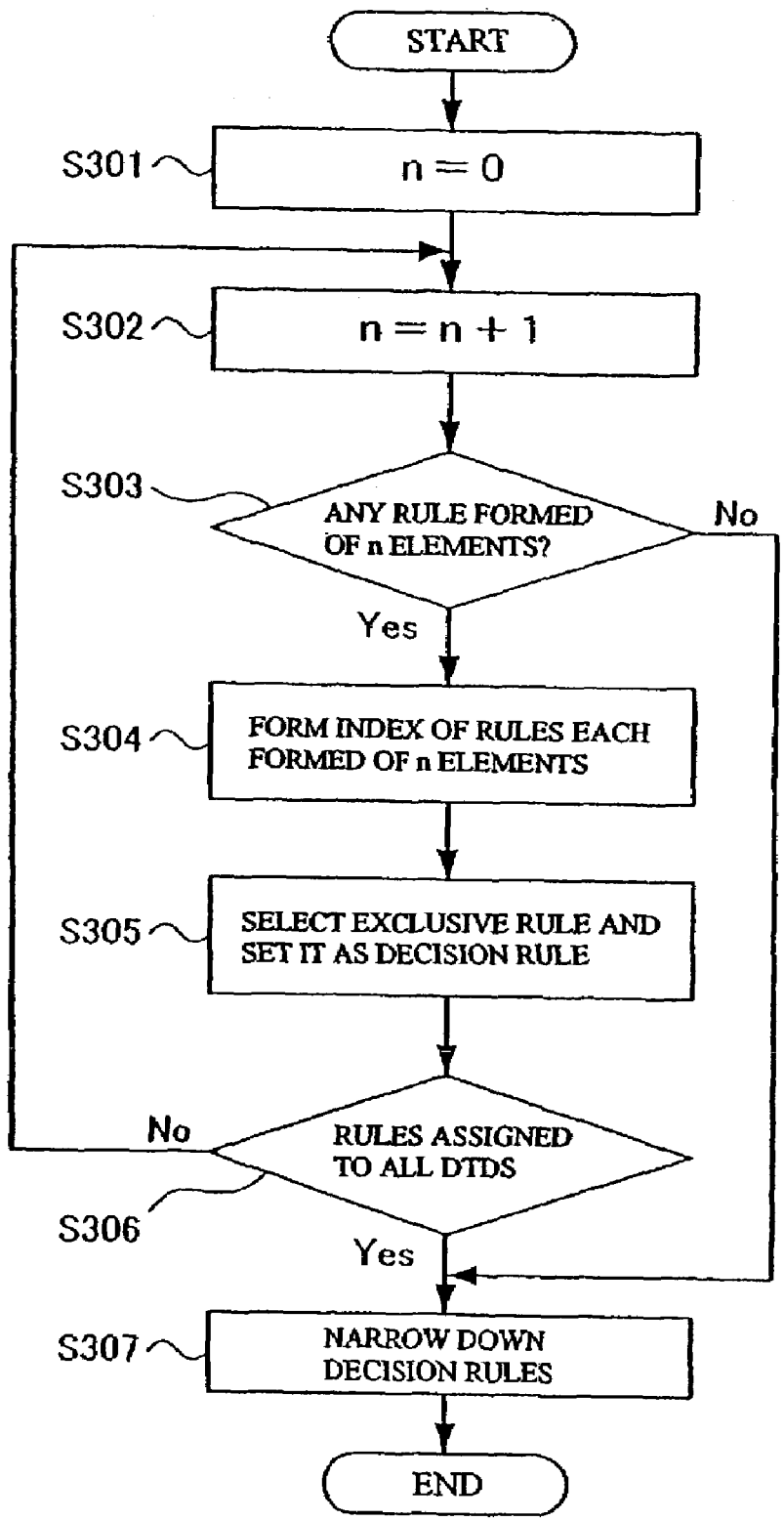
FIG. 3 is a flowchart for explaining the operation of a decision rule generation section in the first embodiment.

FIG. 3 is a flowchart for explaining the operation of the decision rule generation section 10. The decision rule generation section 10 reads out from the DTD storage section 30 a set of DTDs to some of which an XML document to be handled is probable to match, and sets the read set of DTDs as an object to be processed. Referring to FIG. 3, the decision rule generation section 10 initializes a parameter n which indicates the number of elements (steps 301 and 302), extracts a sequence of elements (referred to as a rule) consisting of n elements (initially n=1), and forms an index for relating the rule and DTD names to each other (steps 303 and 304). The decision rule generation section 10 then extracts an exclusive rule which occurs for only one DTD from the obtained rule formed of the n elements, i.e., a rule in which only one DTD is related in the formed index, and sets the extracted rule as a decision rule for the corresponding DTD (step 305). The decision rule generation section 10 checks whether rules have been set with respect to all the DTDs, returns the process to step 302 if there is a DTD with which no rule has been set (step 306), and repeats the processing from step 303 by incrementing the value of parameter n by one. After setting rules with respect to all the DTDs, the decision rule generation section 10 narrows down the set rules (step 307).

To narrow down the rules, redundancy is removed from the set rules and optimal ones among the decision rules are selected. The number of selected decision rules with respect to one DTD is not limited to one. In this embodiment, narrowing down of rules is performed on the following three principles.

(1) An XML document is analyzed by being scanned in document order, i.e., from the beginning to the end of the document. Of rules set with respect to a predetermined DTD, some relating to an element which occurs earlier in the DTD are selected while the others relating to an element which occur later in the DTD are removed.

(2) In an element type declaration for an XML document, occurrence of a variable of number of elements is permitted (by *, +, ?, etc.). The processing cost in the case of testing as to whether this rule is met is high. Therefore, such a rule is removed if a rule in which the numbers of elements are not variable exists already.

(3) In a case where a predetermined rule is part of another rule, one of these rules is necessarily met if the other is met. In such a case, therefore, in order to reduce the processing cost for testing as to whether each rule is met, one of the two rules in which the total length of the constituent elements is shorter than that in the other rule is selected and the other rule is removed.

After generating decision rules in the above-described manner, the decision rule generation section 10 combines the generated decision rules into a decision rule base and stores the decision rule base in the decision rule base storage section 20.

The decision rule base used in this embodiment is constituted by a rule set formed of if-then rules and a flag set. That is, it is a rule base for identifying a DTD when a corresponding condition which is occurrence of a predetermined element is satisfied. Each rule is in if (test)-then (action) form. In the test portion, a logical expression formed of a test "an element occurs" and an expression in the form of "flag=true/false" is described.

Further, in the decision rule base, decision rules are organized as described below.

(1) As a decision rule formed of only one element (e.g., an element A), a rule in the form:
"if (element A occurs) then Di" is registered in the decision rule base. In this expression, Di is a symbol indicating a DTD which meets this decision rule.

(2) A decision rule having a plurality of elements is made in such a manner that a flag is set with respect to occurrence of an element except for the last element. For example, with respect a sequence of elements B and C, two rules:
"if (element B occurs) then flag1=true", and
"if (element C occurs && flag1=true) then Dj" are made. In this expression, Dj is a symbol indicating a DTD which meets this decision rule.

(3) A rule with a symbol for permission of a variable number of elements such as *, +, or ? is registered in a state without the symbol.

XML document determination processing performed by the XML parser 40 and the DTD determination section 50 using the above-described decision rule base will next be described.

Figure 4:
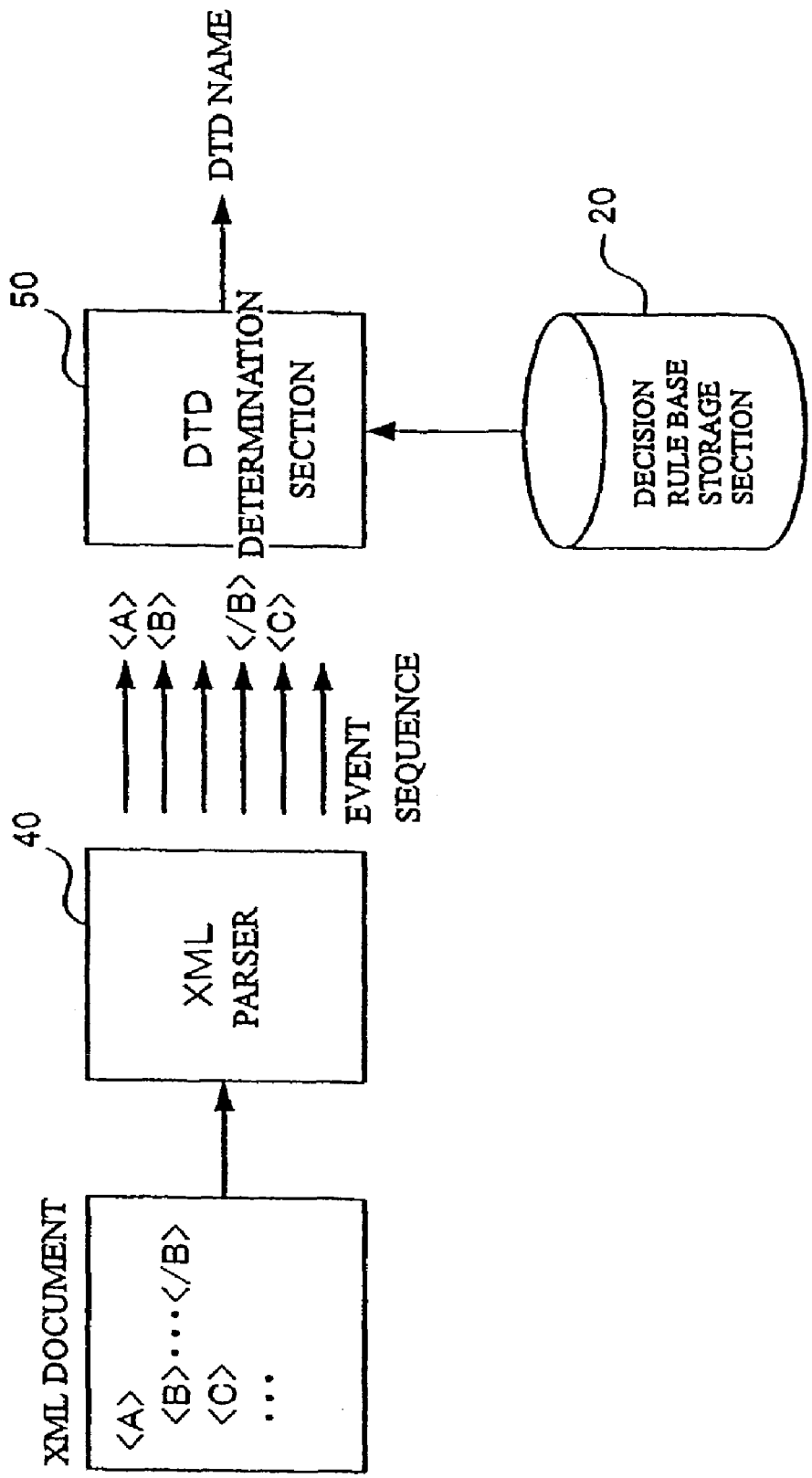
FIG. 4 is a diagram for explaining the flow of XML document determination processing in the first embodiment.

FIG. 4 is a diagram for explaining the flow of XML document determination processing in this embodiment. XML document determination processing includes XML document analysis processing performed by the XML parser 40 and determination processing performed by the DTD determination section 50. It is assumed that at an initial stage an XML document (input document) input via a network or the like to be processed is stored in the main memory 103 shown in FIG. 1 in a state of being accessible by the CPU 101 operating as the XML parser 40 and the DTD determination section 50.

Referring to FIG. 4, the XML parser 40 first reads out the XML document to be processed from the main memory 103 and analyzes the XML document. The XML parser 40 scans the XML document from the beginning and extracts occurrences of elements and attributes as events. A sequence of events thereby extracted is delivered to the DTD determination section 50. As the XML parser 40, an SAX parser, for example, may be used. The DTD determination section 50 examines the sequence of events received from the XML parser 40 by using the decision rule base stored in the decision rule base storage section 20. More specifically, in all the flags in the decision rule base, "false" is first set. When an element occurs in the event sequence which is being processed, the test portion of each rule in the decision rule base is checked. If the element passes the test, then an action is executed. If a DTD name is written in the action portion, the DTD name is output and the processing is terminated.

After the above-described processing, a validating XML processor verifies the processing-object XML document on the basis of the DTD with the DTD name output from the DTD determination section 50. By this verification, final verification is made as to whether the XML document matches the DTD. XML document verification processing performed by the validating XML processor is the same as verification in the conventional art. However, since DTD to be verified are narrowed by the above-described determination processing performed by the XML parser 40 and the DTD determination section 50, the overall processing cost is remarkably reduced. The validating XML processor may be provided in an application using the XML document or may be provided as a component of the XML document determination system in accordance with the present invention. In the case where it is provided in the system of this embodiment, the output from the system is not the DTD to which an XML document to be processed matches but a verification result as to whether the XML document matches the determined DTD.

Processing in accordance with this embodiment will be described with respect to concrete examples of DTDs and XML documents. Four DTDs D1, D2, D3, and D4 shown in FIG. 5 are assumed to have been provided as a set of DTDs to some of which a transferred XML document is possible to match.

A case where a DTD to which an XML document ex1.xm1 shown in FIG. 6 matches is determined will be discussed. In this case, since an element E occurs in the XML document ex1.xm1 since element E exists only in D2, the XML document ex1.xm1 is supposed to match to D2 (at least not to match to any of the other DTDs) at the stage when the occurrence of element E is confirmed.

A case where a DTD to which an XML document ex2.xm1 shown in FIG. 7 matches is determined will also be discussed. In this case, none of the elements occurring in this XML document exists as an element existing in only one of the DTDs. However, the content corresponding to occurrence of a sequence of two elements B and D exists only in D3. Therefore the XML document ex2.xm1 is supposed to match to D3 (at least not to match to any of the other DTDs) at the stage when the occurrence of the sequence of elements B and D is confirmed.

To realize the above-described determination, the decision rule generation section 10 first extracts decision rules from the set of four DTDs shown in FIG. 5 and forms a decision rule base. Referring to the flowchart of FIG. 3, element sequences (rules) each consisting of one element are extracted on the basis of element type declarations contained in the DTDs D1, D2, D3, and D4 shown in FIG. 5, and an index shown in FIG. 8 is formed. Rules each occurring with only one DTD (indicated by one DTD name shown alone on the right-hand section of the index) are extracted and set as decision rules for the corresponding DTDs.

FIG. 9 shows decision rules obtained from the index shown in FIG. 8. In the decision rules shown in FIG. 9, DTDs (D1, D3) exit with which no rule has been set. The process then returns to step 302 in FIG. 3 and the same processing is repeated with respect to rules each formed of two elements. An index shown in FIG. 10 is thereby formed. Rules each occurring with only one DTD are extracted and set as decision rules for the corresponding DTDs. FIG. 11 is a diagram formed by reflecting in FIG. 9 the decision rules obtained from the index shown in FIG. 10. In the state shown in FIG. 11, rules are set with respect to all the DTDs. Then the rules are narrowed down. According to the decision rules shown in FIG. 11, the decision rules relating to D2, D3, and D4 are narrowed down. Narrowing down of the decision rule relating to D4 will be described in detail by way of example.

The decision rule relating to D4, shown in FIG. 11, is Rule–D4={(F), (H), (F, H), (H, G?)}. Among these elements, element H is scanned before element F according to the definition of D4 shown in FIG. 5. Each of these elements is an indispensable element. Therefore, if a given XML document matches D4, element F exists necessarily. Consequently, the rule relating to element H can be removed according to the principle (1). Next, since the rule (F) in which the number of elements is fixed exists with D4, the rule including occurrence of a variable number of elements (H, G?) is removed according to the principle (2). The remaining two rules (F) and (F, H), (F) is part of (F, H). Therefore the rule (F, H) having a longer total length of elements is removed according to the principle (3).

Figure 13:
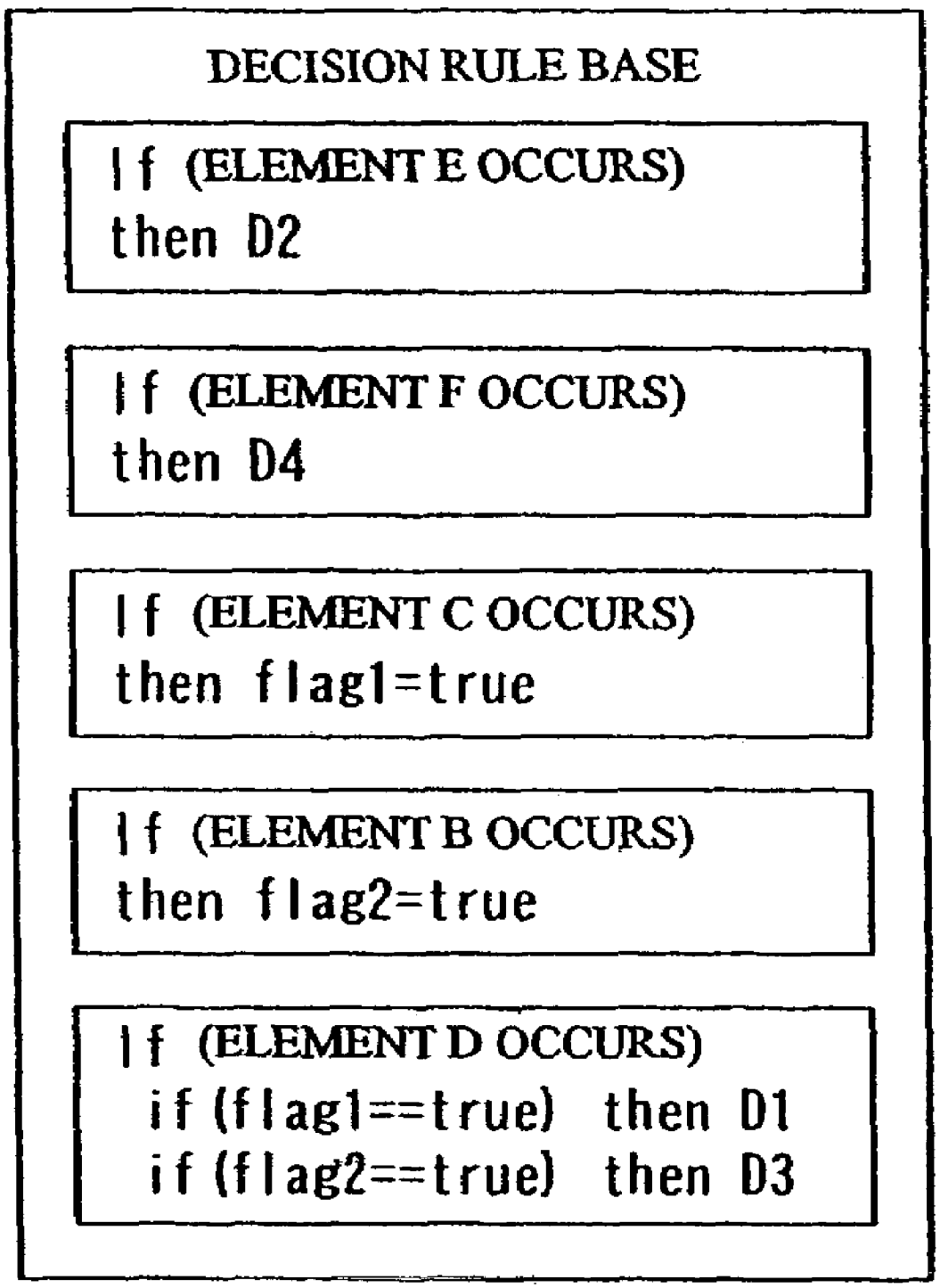
FIG. 13 is a diagram showing a decision rule base formed from the decision rules shown in FIG. 12 and relating to four DTDs D1 to D4.

The same processing is performed on the decision rules relating to D2 and D3. The decision rules shown in FIG. 11 are narrowed down as shown in FIG. 12. Thereafter, the decision rule generation section 10 forms a decision rule base from the decision rules shown in FIG. 12, and stores decision rule base in the decision rule base storage section 20. FIG. 13 shows the decision rule base which is formed from the decision rules shown in FIG. 12, and which relates to the four DTDs D1 to D4. The DTD determination section 50 determines the DTD for the XML document by using generated decision rule base.

Initially, the XML parser 40 obtains event sequence by analyzing the XML document to be processed, and delivers the event sequence to the DTD determination section 50. The DTD determination section 50 collate the XML document event sequence received from the XML parser 40 with the decision rule base stored in the decision rule base storage section 20 to determine to which one of the DTDs the XML document matches. For example, the XML document shown in FIG. 7 is assumed to have been input as an object of processing. The XML parser 40 analyzes this XML document to extract events:

occurrence of <A>, occurrence of <B>, and occurrence of <D> and delivers these events to the DTD determination section 50 (events other than the occurrences of the elements are omitted). The DTD determination section 50 tests each event for determination as to whether there is any rule applicable to the event. In this case, by the occurrence of <B>, a rule:

If (element B occurs) then flag2=true is triggered and action flag=true is executed. Further, in response to the event: occurrence of element <D>, If (element D occurs)

if (flag1==true) then D1 if (flag2==true) then D3 is triggered and D3 is finally selected. In the above-described procedure, since the rules corresponding to element names are used, no rule competition occurs, in contrast with ordinary production systems.

SECOND EMBODIMENT

In the second embodiment, an automaton corresponding to each element type declaration of a DTD to which an XML document to be handled is probable to match is generated. Determination processing using such automatons is performed on DTDs to some of which the XML document is probable to match to enable efficient identification of the DTD to which the XML document matches.

This embodiment of the present invention can be realized by using a computer having the same hardware configuration as that of the computer for the first embodiment.

Figure 14:
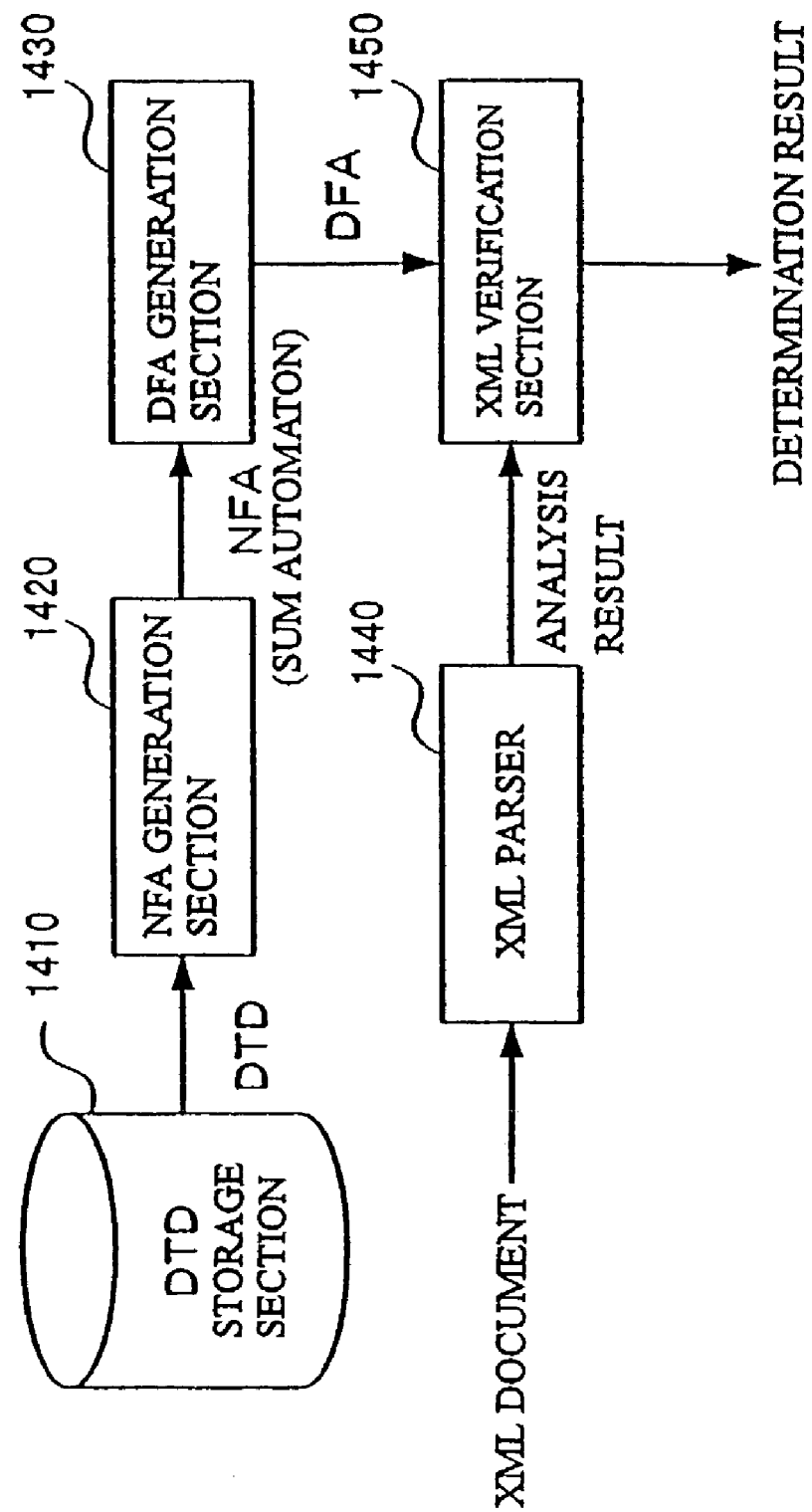
FIG. 14 is a block diagram for explaining a configuration of an XML document determination system in a second embodiment of the present invention.

FIG. 14 is a block diagram for explaining the configuration of an XML document determination system in accordance with the second embodiment. Referring to FIG. 14, the XML document determination system of this embodiment has a DTD storage section 1410 in which a set of DTDs to some of which an XML document to be handled should match is stored, a nondeterministic finite state automaton (NFA) generation section 1420 which generates an NFA from m number of element type declarations (regarded as regular representations) with respect to one element name on the basis of the set of DTDs, a deterministic finite state automaton (DFA) generation section 1430 which converts the generated NFA into a DFA, an XML parser 1440 for analyzing an XML document (input document) to be processed, and an XML verification section 1450 which determines to which one of the DTDs the XML document analyzed by the XML parser 1440 matches by using the DFA generated by the DFA generation section 1430. The XML document determination system also has an input section (not shown) to which XML documents (input documents) to be processed after being analyzed by the XML parser 1440 are input via a network or a predetermined input device, and through which the input documents are stored in a main memory 103 or the like.

In the system configuration shown in FIG. 14, the NFA generation section 1420, the DFA generation section 1430, the XML parser 1440 and the XML verification section 1450 are software blocks realized by the program-controlled CPU 101 shown in FIG. 1. A program for realizing these functions by controlling the CPU 101 is provided by being distributed in a state of being stored in a magnetic disk, an optical disk, a semiconductor memory or any other recording medium or distributed over a network, and is stored in the main memory 103. Also, the DTD storage section 1410 is realized in the main memory 103. Data stored in the main memory 103 can be saved to a storage, e.g., the hard disk 150 if necessary. Also in this embodiment, NFA generation processing performed by the NFA generation section 1420, DFA generation processing performed by the DFA generation section 1430, and DTD determination (verification) processing performed by the XML parser 1440 and the XML verification section 1450 are independent of each other. Therefore the components may be realized by using one computer or a plurality of computers. For example, in a case where the NFA generation section 1420 and the DFA generation section 1430 are realized by using one computer and the XML parser 1440 and the XML verification section 1450 are realized by using another computer, DFAs are delivered from the computer operating as the NFA generation section 1420 and the DFA generation section 1430 to the computer operating as the XML parser 1440 and the XML verification section 1450 via a network or a recording medium such as a magnetic disk. The DTD storage section 1410 is provided in combination with each computer.

The functions of the XML document determination system shown in FIG. 14 will be described in detail. An input to the XML document determination system of this embodiment is an XML document having no DTD information, and an output from the XML document determination system is a verification result as to whether the XML document matches the DTD determined in accordance with this embodiment.

Three DTDs D5, D6, and D7 shown in FIG. 15 are assumed to have been initially stored in the DTD storage section 1410. In each DTD, an element type declaration is defined with respect to element A, as shown in FIG. 15.

Figure 16:
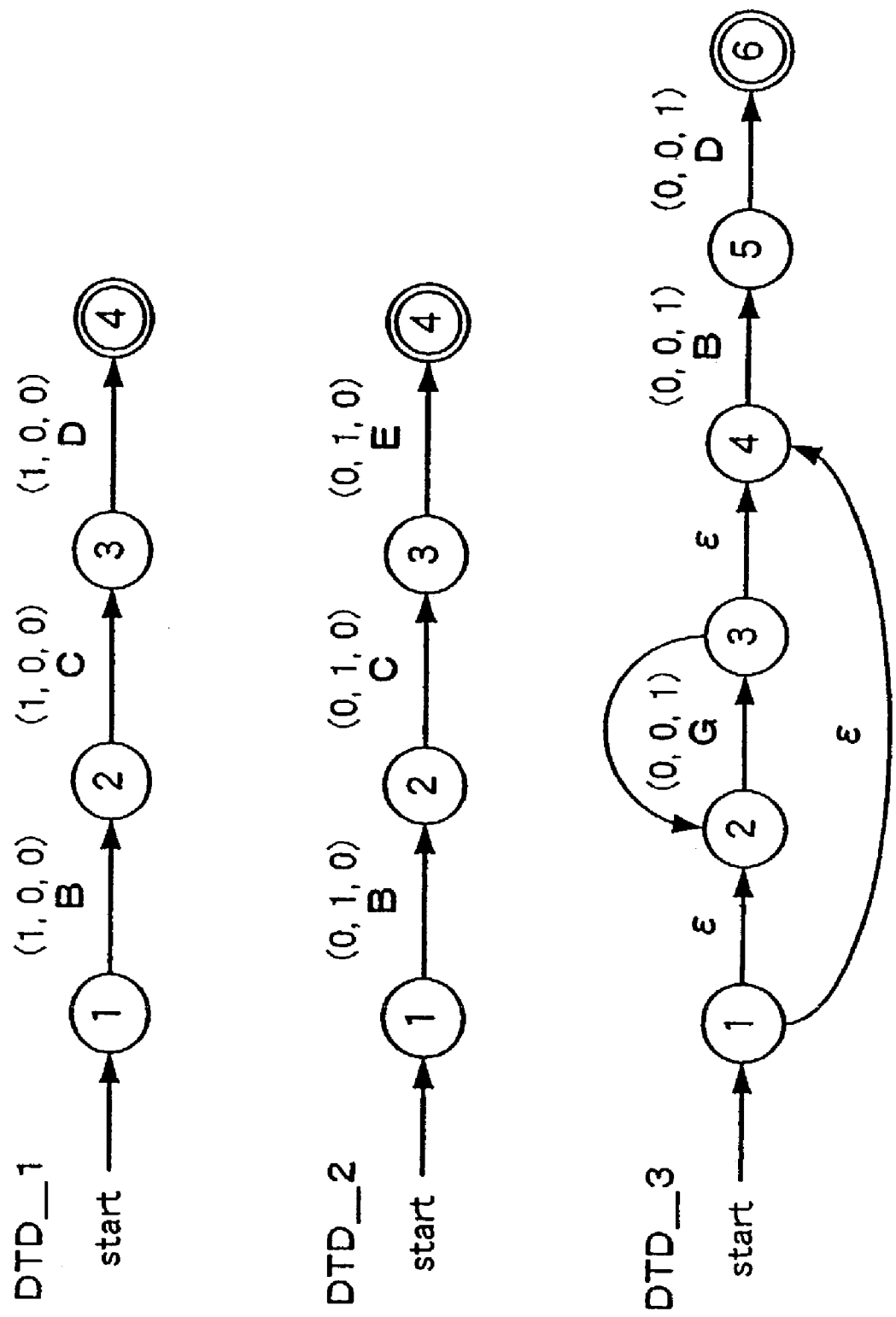
FIG. 16 is a diagram showing NFAs corresponding to D5, D6, and D7 shown in FIG. 15.

The NFA generation section 1420 first generates an NFA corresponding to each of the three DTDs shown in FIG. 15. A well-known method can be used for generation of NFAs in this embodiment. It will not be described in this specification. FIG. 16 is a diagram showing NFAs corresponding to D5, D6, and D7 shown in FIG. 15.

The NFA generation section 1420 imparts a bit vector having a length m (m is the number of DTDs), that is, formed by m bits (elements), to a transition rule $\delta$ (q, a), a$\neq\epsilon$ in each of the generated NFAs, sets the ith ($1 \leq i \leq m$) bit to a value 1 (turns on the bit) with respect to the ith DTD, and the other bits to a value 0 (turns off the bits). For example, in D5 (the first DTD in FIG. 15), a bit vector (1, 0, 0) is imparted to the transition rule $\delta$ (q1, B)=q2, which is a rule for transition to state 2 when symbol B is read in state 1.

Figure 17:
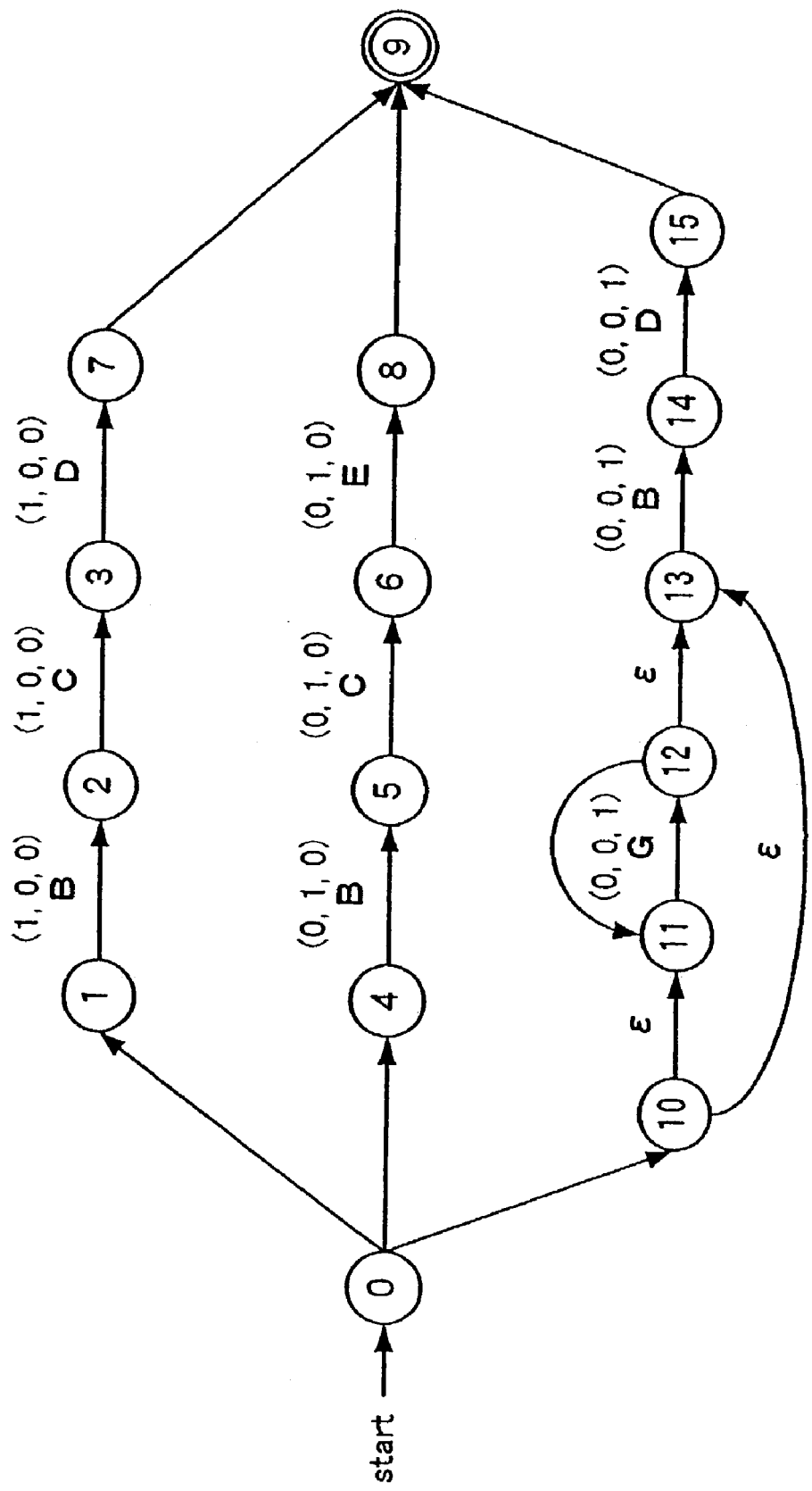
FIG. 17 is a diagram showing a sum automaton of the three NFAs shown in FIG. 16.

The NFA generation section 1420 combines the generated m NFAs into a sum automaton (A1|A2| |An, Ai is NFA). If the regular representations of the DTDs are R1, R2, , Rn, the generated sum automaton is equivalent to (R1|R2| |Rn). With respect to the above-mentioned three DTDs, an NFA ((B, C, D)|(B, C, E)|(G*, B, D)) is generated. That is, the sum automaton can be said to be an NFA corresponding to the set of DTDs stored in the DTD storage section 1410. The sum automaton is formed by generating a new initial state from which a $\epsilon$ transition to the beginning of each NFA is made and a new final state to which a $\epsilon$ transition from the final state of each NFA is made. FIG. 17 is a diagram showing the sum automaton obtained from the three NFAs shown in FIG. 16. Referring to FIG. 17, the bit vectors imparted to the NFAs shown in FIG. 16 are imparted at corresponding position in the sum automaton.

The sum automaton (NFA) generated as described above is stored in a predetermined area in the main memory 103. Thereafter, the DFA generation section 1430 reads out from the main memory 103 the sum automaton (NFA) generated by the NFA generation section 1420, and converts the sum automaton into a DFA. For conversion from NFA to DFA, a well-known method, e.g., a partial construction method can be used. However, at the time of conversion from NFA to DFA, a necessary bit vector is computed to be imparted to a transition rule newly generated.

FIG. 18 is a diagram showing an algorithm expanded in accordance with this embodiment in a case where a DFA is generated by using the partial construction method. The partial construction method is a method of constructing a DFA by regarding as one state a state set which can be reached from a predetermined state. The portion indicated by being underlined in FIG. 18 corresponds to the extended portion in accordance with this embodiment, i.e., the operation for imparting a bit vector to the state of a generated DFA. In FIG. 18, T is a state set (e.g., {1, 2, 3}); DTran[T, a] is a transition rule for transition from the state (set) T by an input symbol a; Dstates is a stack in which the state set is placed; $\epsilon$-closure(q) is a set of states of NFA each of which can be reached only by $\epsilon$-transition from the state of NFA; $\epsilon$-closure(T) is a set of states of NFA each of which can be reached only by $\epsilon$-transition from a predetermined state s of NFA contained in T; and move(T, a) is a set of states of NFA to one of which a transition is made by input symbol a from the predetermined state s of NFA contained in T.

The algorithm will be will be outlined with reference to the NFA shown in FIG. 17 and to FIG. 18. The NFA shown in FIG. 17 is defined as shown below.

State set S={0, 1, 2, 3, 4, 5, 6, 7, 8, 9, 10, 11, 12, 13, 14 ,15} (qi abbreviated as i)

Symbol set $\Sigma$={B, C, D, E, F, G}

Transition rule set={u|u=$\delta$(q, a),}

Initial state q0 f inal state {q9}

Referring to the algorithm in FIG. 18, states each of which can be reached only by $\epsilon$-transition from the beginning state q0 are 0, 1, 4, 10, 11, and 13. That is, $\epsilon$closure(q0)={0, 1, 4, 10, 11, 13}

Therefore {0, 1, 4, 10, 11, 13} is placed in stack Dstatus. This is a new state T.

Next, unmarked state T in Dstatus (only {0, 1, 4, 10, 11, 13} exists and this is selected) is marked and processed with respect to each of the symbols which are the elements of Σ.

For example, with respect to the symbol B, move(T, B)={2, 5, 14}. This is because when the symbol B is input, a transition from 1 to 2, 4 to 5, or 14 to 15 is made. Further, since ε-closure(move(T, B))=ε-closure({2, 5, 14})={2, 5, 14} (ε transition from each state is not made),
U:={2, 5, 14}
and
DTran[{1, 4, 10, 11, 13}, B]={2, 5, 14}
Then, if {1, 4, 10, 11, 13} is state Q0 and {2, 5, 14} is a state Q1, a new transition rule:
DTran[Q0, B]=Q1 is generated.

In this embodiment, when this new transition rule is generated, bit vectors for the new transition rule are generated and imparted to the states of U to each of which a transition is made by input of symbol B. The bit vector of this new transition rule is the logical sum of the bit vectors imparted to the rules for transitions to the states of U. That is, since U={2, 5, 14}, the logical sum (OR) of the bit vectors imparted to the three transition rules:

δ (1, B)=2
δ (4, B)=5
δ (13, B)=14 is taken. Since the respective bit vectors are (1, 0, 0), (0, 1, 0), and (0, 0, 1), the bit vector of the new transition rule DTran[Q0, B]=Q1 is (1, 1, 1).

Thus, the transition rule relating to the DFA with the bit vector is obtained by processing with respect to symbol B. That is, DTran[Q0, B]=Q1, (1, 1, 1)

Next, processing with respect to symbol C is performed. However, move(T, B) cannot be defined in this case and this step is therefore skipped. Processing is performed in the same manner with respect to each of symbols D and E. With respect to symbol G, move(T, G)={12}
and
δ-closure({12})={11, 12, 13}
The corresponding bit vector is (0, 0. 1). If {11, 12, 13} is a new state Q2,
DTran[Q0, G]=Q2, (0, 0, 1)

Figure 19:
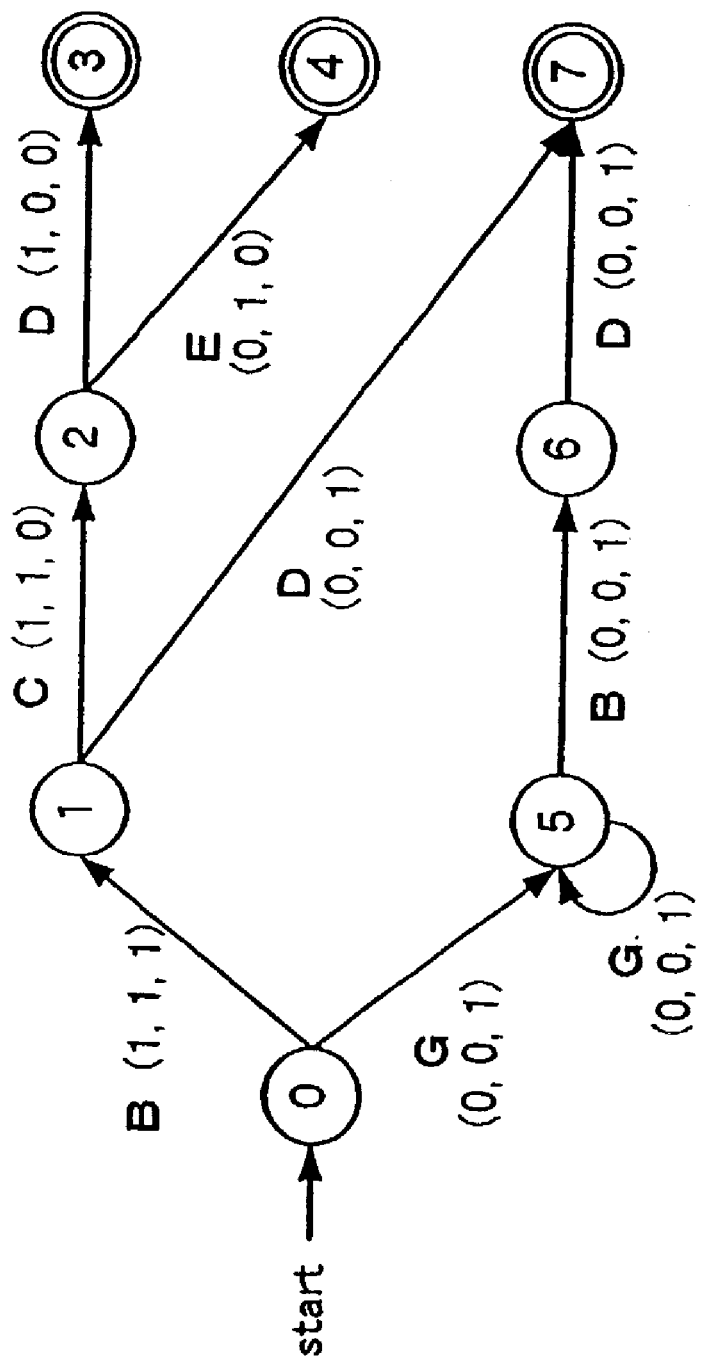
FIG. 19 is a diagram showing a DFA generated by the algorithm shown in FIG. 18 from the NFA shown in FIG. 17.

The same processing is repeated to obtain a DFA with a bit vector. FIG. 19 is a diagram showing a DFA generated from the NFA shown in FIG. 17 on the basis of the algorithm shown in FIG. 18.

On the other hand, the XML parser 1440 reads out the XML document to be processed from the main memory 103 and analyzes the XML document. The XML parser 1440 scans the XML document from the beginning and extracts occurrences of elements and attributes as events. A sequence of events thereby extracted is delivered to the XML verification section 1450.

The XML verification section 1450 determines to which of the DTDs the XML document to be processed matches by using the DFA obtained as described above. Therefore the XML verification section 1450 corresponds to the DTD determination section 50 in the first embodiment. In this embodiment, however, since determination is made by using a DFA generated from DTDs, matching of the XML document to some of the DTDs can be ensured if the processing proceeds to the final state of DFA. That is, verification of the XML document with respect to the DTDs is simultaneously performed.

Figure 20:
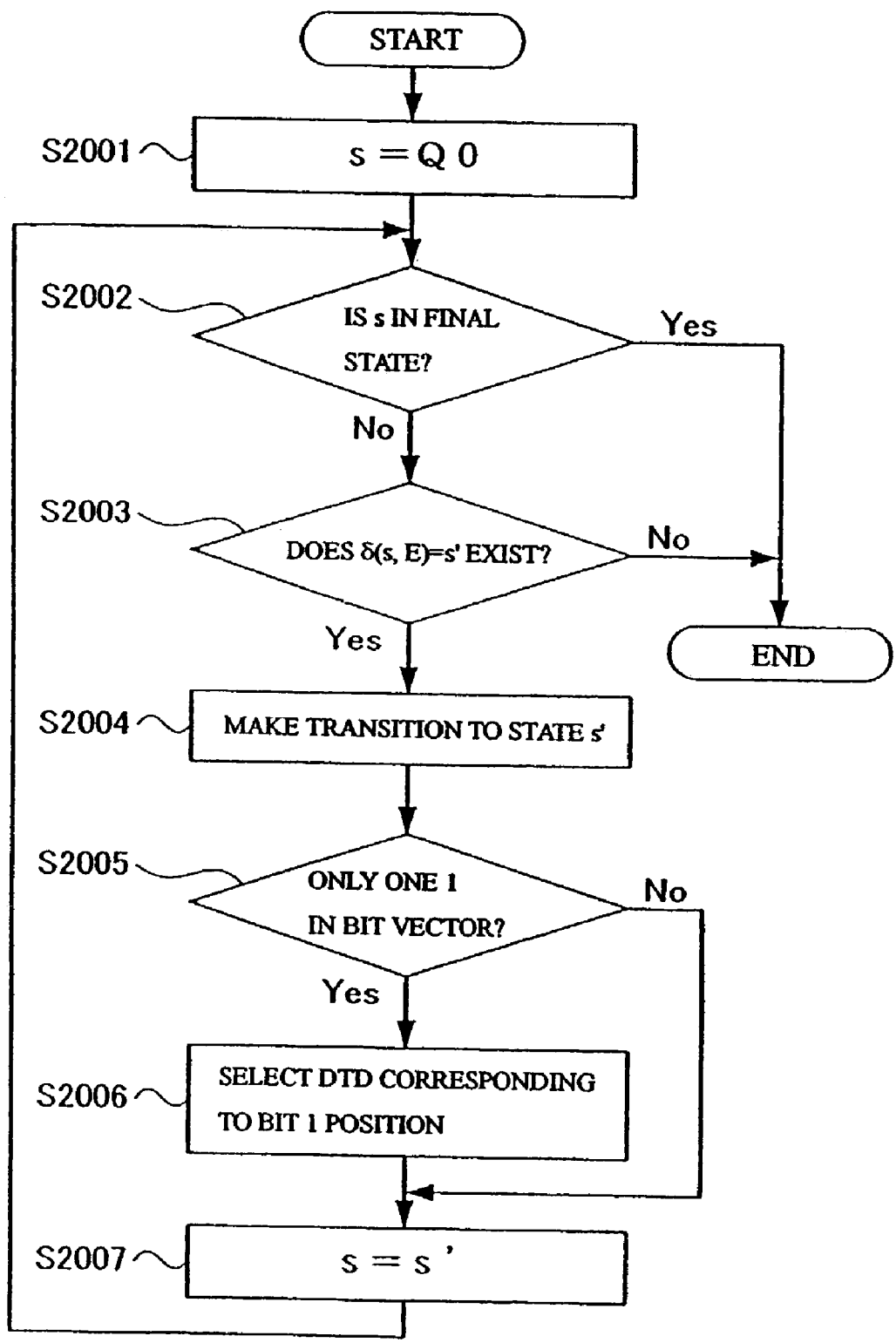
FIG. 20 is a flowchart for explaining DTD determination processing by an XML verification section in the second embodiment.

FIG. 20 is a flowchart for explaining DTD determination processing performed by the XML verification section 1450. Referring to FIG. 20, the XML verification section 1450 first sets a state s as initial state Q0 (step 2001) and performs a sequence of processing operations from initial state Q0 (step 2002).

If a transition rule (δ (s, E)=s') when a predetermined element (assumed to be element E) is input exists, a transition from the state s to the state s' is made (steps 2003 and 2004). If no such transition rule exists, it is determined that no match can occur to any one of the DTDs and the processing is terminated.

Next, if only one of the bits of the bit vector imparted to the transition rule is 1, the DTD corresponding to the bit position at which 1 is set is selected as a matching DTD (steps 2005 and 2006). The state s' is then set as the state s and the process returns to step 2002 (step 2007). If the state s is the final state, the process is terminated (step 2002). For example, determination as to whether the state s is the final state is made by setting a flag for identifying each state as the final or non-final state.

For example, in a case where the input XML document is the XML document shown in FIG. 7, the occurrences of the elements are input in the order of elements A, B, and D and the processing is repeated in accordance with the above-described procedure. According to the DFA shown in FIG. 19, state transitions 0→1→7 are made to reach the final state.

DTD determination processing using a DFA may be stopped when a DTD to which an XML document should match is uniquely determined. For example, when a transition from state 0 to state 5 in the DFA shown in FIG. 19 occurs, the DTD to which the XML document should match is limited to D7 shown in FIG. 15. The processing may be stopped at this stage.

In this case, the XML document determination system of this embodiment outputs the kind of DTD determined in the same manner as in the first embodiment and delivers the kind of DTD to the application for processing the XML document. In this case, if an element other than elements G and B is input after state 5, or if an element other than element D is input after a transition to state 6 has been made by input of element B, a mismatch to D7 results. Therefore there is a need to verify matching of the XML document to D7, for example, through the application for processing the XML document. If the XML verification section 1450 performs DTD determination processing until the final state of the DFA is reached, it is ensured that the XML document to be processed is valid with respect to the matching DTD when the matching DTD is determined. In this case, there is no need for verification through the application or the like.

MODIFICATION OF SECOND EMBODIMENT

The above-described second embodiment of the present invention is implemented in a complicated manner since bit vectors are imparted to the state transitions in the NFA and DFA, so that the actual processing by a computer is liable to be lower in speed. Then a method of imparting bit vectors not to state transitions but to states is taken into consideration.

This method reduces the amount of hardware resources required for processing because the number of states is smaller than the number of state transitions in the NFA and DFA. A system in which bit vectors are imparted to states can be easily implemented since it has an affinity to an ordinary method for realizing an automaton in a computer.

Figure 21:
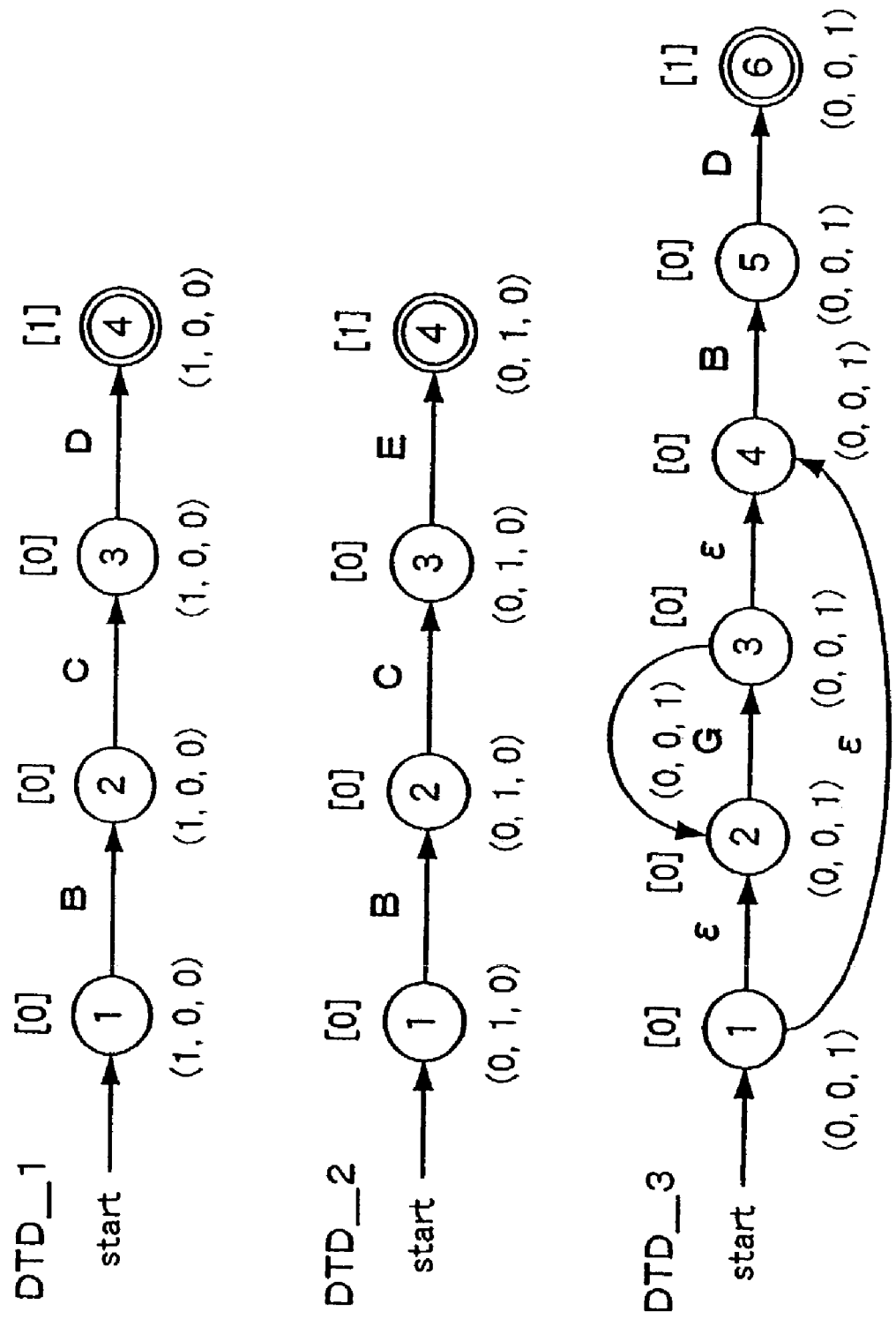
FIG. 21 is a diagram showing NFAs generated with respect to the DTDs shown in FIG. 15.

In this example of modification, the NFA generation section 1420 of this embodiment generates NFAs respectively corresponding to DTDs stored in the DTD storage section 1410, imparts a bit vector having a length m (m: the number of DTDs) to each state, and also imparts to each state a termination-possible flag for discrimination between the final and non-final states. FIG. 21 is a diagram showing NFAs generated in this manner with respect to the three DTDs (D5, D6, D7) shown in FIG. 15. In the example shown in the figure, the final state corresponds to "1" of the termination-possible flag.

Figure 22:
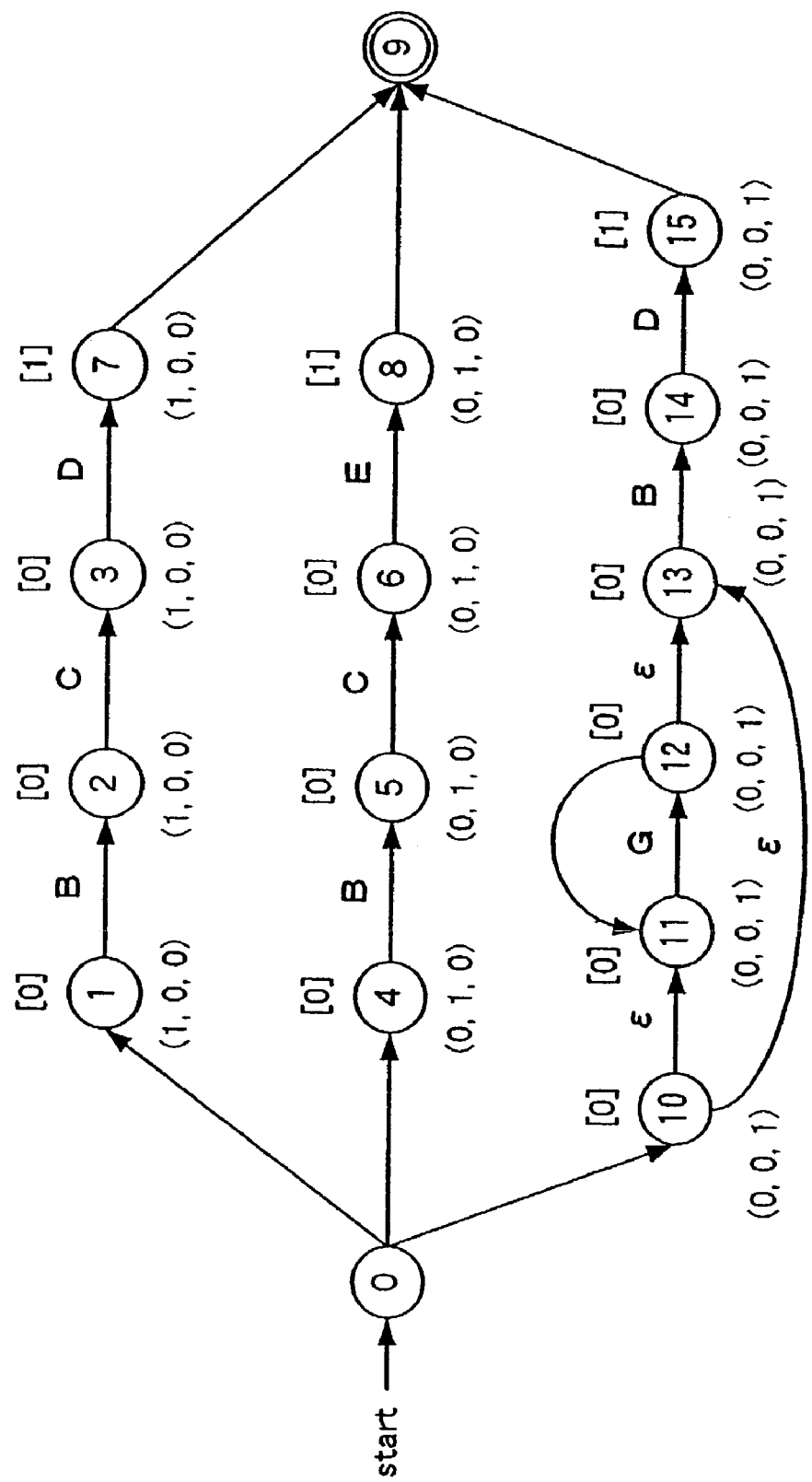
FIG. 22 is a diagram showing a sum automaton of the NFAs shown in FIG. 21.

Subsequently, the NFA generation section 1420 generates a sum automaton of the generated NFAs. This sum automaton has a new initial state with a $\epsilon$ transition to the beginning of each of the NFAs generated in correspondence with the DTDs, as does the sum automaton shown in FIG. 17. In this sum automaton, however, the final states are not combined into one by using $\epsilon$ transition. FIG. 22 is a diagram showing the sum automaton of the three NFAs shown in FIG. 21. As shown in FIG. 22, the three final states corresponding to the NFAs shown in FIG. 21 exist.

Subsequently, the DFA generation section 1430 converts the sum automaton generated by the NFA generation section 1420 into a DFA.

First, two operations $\epsilon$-closureWB(q) and $\epsilon$-closureWB(T) are defined.

Expression $\epsilon$-closureWB(q) (q represents a predetermined state in each NFA) represents information formed of three elements:
  state set $\epsilon$-closure(q)
  the logical sum of the bit vectors imparted to the states of $\epsilon$-closure(q)
  the logical sum of the termination-possible flags imparted to the states of $\epsilon$-closure(q).

Expression $\epsilon$-closureWB(T) (T is a state set) represents the result of obtaining $\epsilon$-closureWB(q) with respect to each state q in T and obtaining the sum of the elements obtained from $\epsilon$-closureWB(q).

FIG. 23 is a diagram showing an extended algorithm in which the above-described operations are reflected in a case where a DFA is generated by using a partial construction method.

Figure 24:
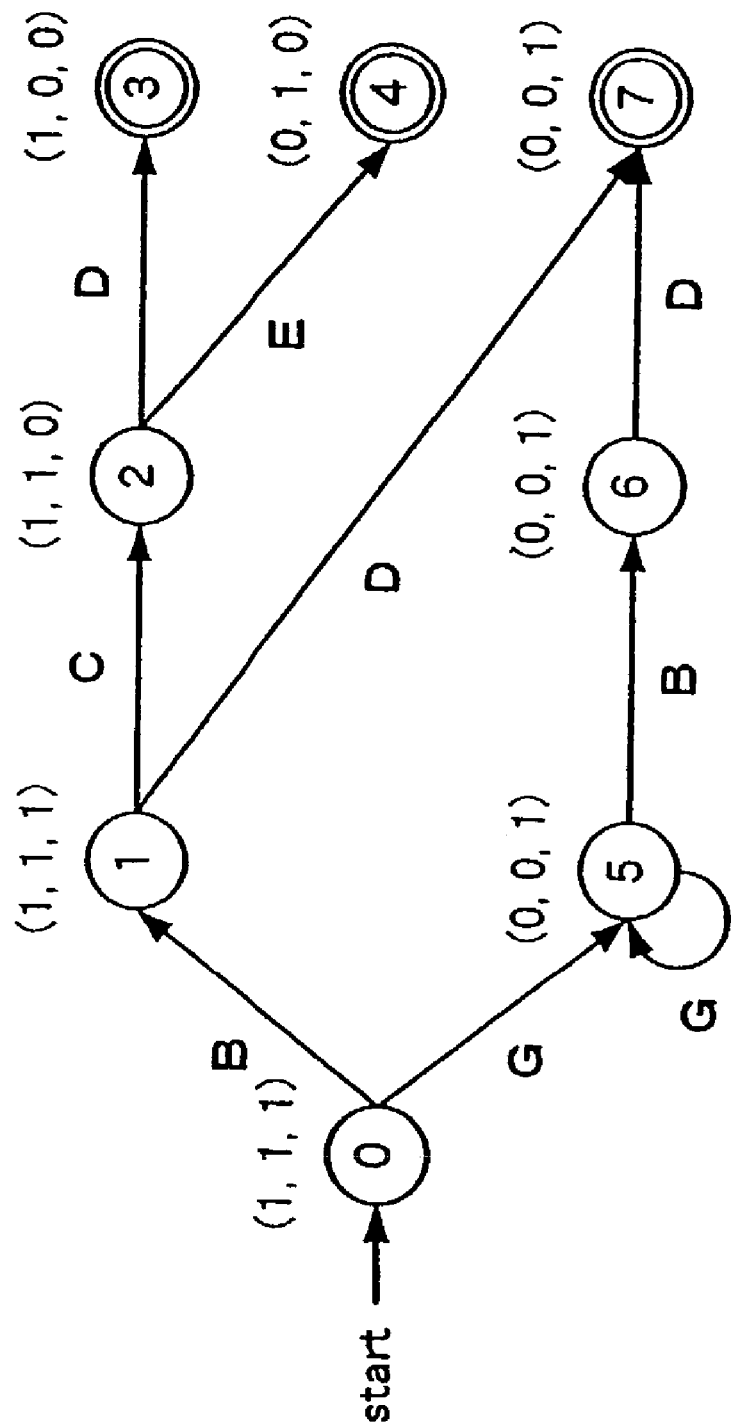
FIG. 24 is a diagram showing a DFA generated from the sum automaton shown in FIG. 22 so that the algorithm shown in FIG. 23 is reflected therein.

FIG. 24 is a diagram showing a DFA generated from the sum automaton shown in FIG. 22. The XML verification section 1450 determines to which one of the DTDs the XML document to be processed matches by using the DFA obtained as described above.

Figure 25:
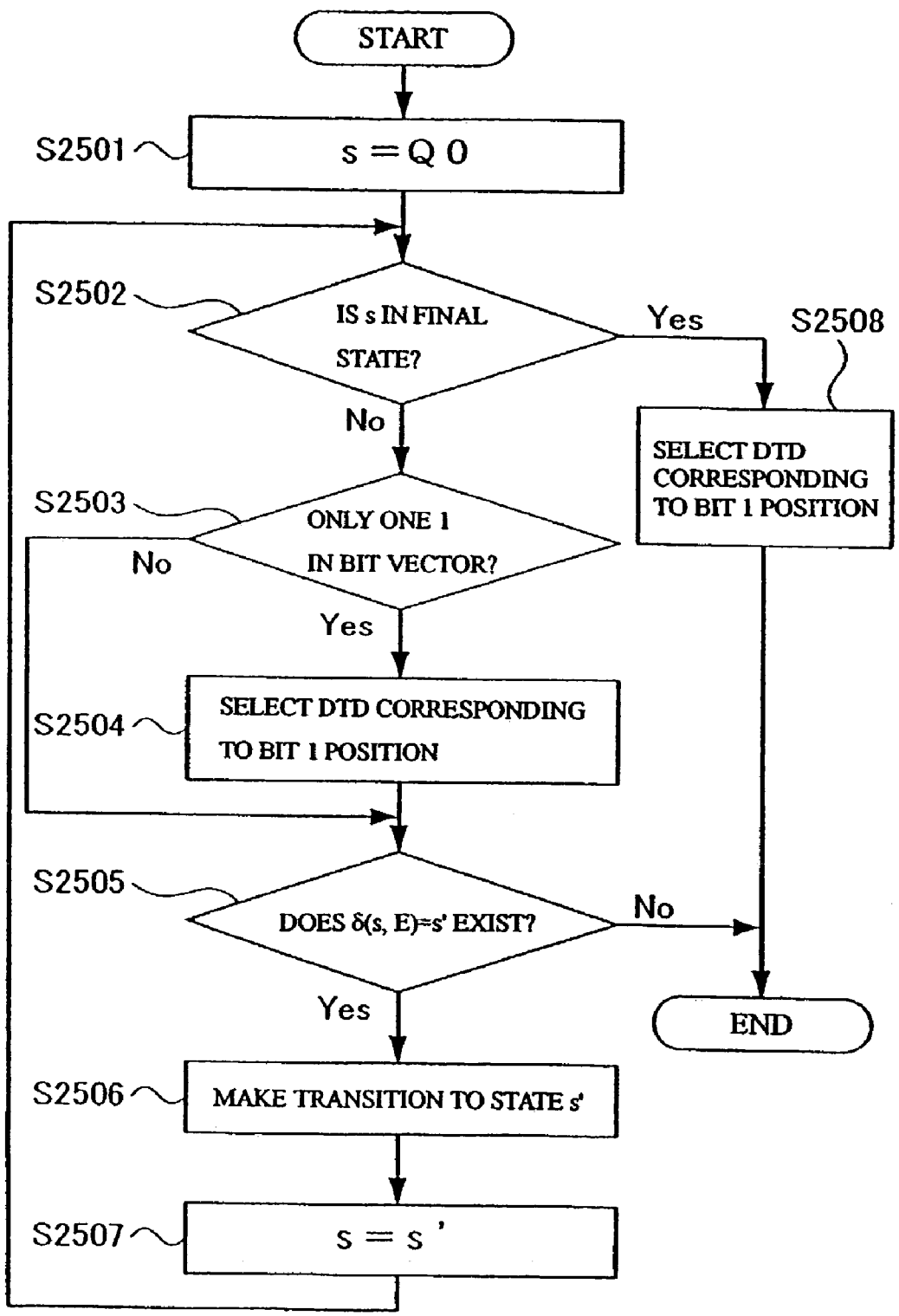
FIG. 25 is a flowchart for explaining DTD determination processing by an XML verification section in the modification of the second embodiment.

FIG. 25 is a flowchart for explaining DTD determination processing performed by the XML verification section 1450. Referring to FIG. 25, the XML verification section 1450 first sets a state s as initial state Q0 (step 2501) and performs a sequence of processing operations from initial state Q0 (step 2502). If only one of the bits of the bit vector imparted to the state s presently observed is 1, the DTD corresponding to the bit position at which 1 is set is selected as a matching DTD (steps 2503 and 2504).

Next, if a transition rule ($\delta$ (s, E)=s') when a predetermined element (assumed to be element E) is input exists, a transition from the state s to the state s' is made (steps 2505 and 2506). If no such transition rule exists, it is determined that no match can occur to any one of the DTDs and the processing is terminated.

After the transition from the state s to the state s', the state s' is then set as the state s and the process returns to step 2502 (step 2507). If the state s is the final state, the DTD corresponding to the bit position at which 1 is set in the bit vector imparted to the state s is selected as a matching DTD and the process is terminated (steps 2502, 2508).

If the number of DTDs is m, the time taken to form the index in the first embodiment is about O(m*k). O(m*k) means that the computation can be completed within a time period which is a constant multiple of m*k. Also, k represents the number of times the processing shown in the flowchart of FIG. 3 is repeated for extraction of rules formed of one element and extraction of rules formed of two elements, for example. If the number of specific elements existing in each DTD is larger, the amount of processing for forming the index is smaller and the time required for processing is shorter. The time required for making decision rules from the index is about O(n).

In the second embodiment, a larger amount of processing is required to form NFAs and a DFA. In general, to form an NFA, a time O(|r|) proportional to the length of regular representation r is required. For example, if the average length of the regular representations of DTDs is l, the time required to generate NFAs is about O(n*l). It is thought that the value of l is larger than the value of k in ordinary cases. Therefore the first embodiment has a higher efficiency at a preparatory stage (when performing processing for generating decision rules or a DFA) before determination of a DTD to which an XML document should match.

In the second embodiment, at the stage when a DTD to which an XML document should match is actually determined, a state transition table (DFA) is stored in a memory. Therefore the cost for the memory space used in the second embodiment is higher than that in the first embodiment.

In the first embodiment, however, determination is only made as to the probability of an XML document to be processed matching to a predetermined DTD, and it is not certain whether the XML document truly matches the determined DTD before verification using a validating XML processor or the like is actually performed. In contrast, in the second embodiment, it can be ensured that the XML document to be processed matches the determined DTD when the final state of the DFA is reached. When implementating the present invention in an actual computer, the desired method may be selected by considering these advantages and disadvantages.

The above-described processing in each of the embodiments is performed before execution of processing on an XML document by an application. Therefore the invention can be realized by adding the components of one of the embodiments to any of the existing systems without requiring any change in the configuration of the system or the XML processor.

In each of the above-described embodiments, the occurrence and sequence of the elements are used for criteria for determination. However, the above-described determination method may also be applied to processing using attribute definitions. However, no meaning is attached to the order of attributes, and the occurrences of attributes and fixed attribute values may form decision rules.

While the embodiments of the invention have been described with respect to a case where matching between predetermined DTDs and a predetermined XML document is examined to identify some of the DTDs to which the XML document matches, the present invention can, of course, be applied to a process for determining whether a predetermined document in a structured language (e.g., HTML) other than XML matches a predetermined structure type definition.

Thus, according to the present invention, as described above, in a case where there is a need to identify a structure type definition to which a received XML document matches while a certain set of structure type definitions is given, processing for identifying the structure type definition can be performed at a high speed. Also, according to the present invention, a system for performing such processing can be realized without influencing the existing system configurations and implementation of XML processors.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A document processing system comprising:
   a decision rule generation section for generating a decision rule for determining that an XML document, processed in accordance with a simple object access protocol (SOAP) or with an electronic signature, is described in a structured language matches at least one of a plurality of structure type definitions on the basis of unique indispensable elements or a sequence of elements, which exist only in a certain Document Type Definition (DTD), is found from a given particular set of DTDs of the structure type definitions; and
   a memory for storing the decision rule
   a determination section for determining that the XML document matches at least one of the structure type definitions on the basis of the decision rule generated by said decision rule generation section and for enabling a particular DTD to which the XML document matches to be determined.

2. The document processing system according to claim 1, wherein said decision rule generation section forms a rule base for identifying a corresponding structure type definition by using the decision rule on condition that a predetermined element being one of said indispensable elements occurs, and said determination section identifies the structure type definition to which the XML document to be processed matches by collating a sequence of events obtained from the XML document with the rule base formed by said decision rule generation section.

3. The document processing system according to claim 1, wherein said XML document is an XML document having a multiplicity of formats.

4. The document processing system according to claim 1, wherein said processing system performs such processing with no influence on existing system configurations and implementations of XML processors.

5. A document processing method comprising processing an XML document, processed in accordance with a SOAP or with an electronic signature, is described in a structured language using a computer, said step of processing comprising the steps of:
   reading out from a memory a group of given particular structural type definitions to at least one of which the XML document should match;
   generating a decision rule for determining that the document XML corresponds to at least one of structural type definitions included in the group of structural type definitions on the basis of an indispensable element or a sequence of elements, which exist only in a certain Document Type Definition (DTD), is found from a given particular set of DTDs unique to each of the structural type definitions;
   storing the decision rule in the memory; and
   reading out the decision rule from the memory to determine on the basis of the decision rule that the XML document matches at least one of the structural type definitions and enabling a particular DTD to which the XML document matches to be determined.

6. The document processing method according to claim 5, wherein said step of generating the decision rule includes the steps of:
- extracting the sequence of elements constituting each of the structure type definitions; and
- selecting, as the decision rule, each of the extracted sequence of elements which occurs in only one of the structure type definitions.

7. A program storage device readable by machine, tangibly embodying a program of instructions executable by the machine to perform method steps for document processing, said method steps comprising the steps of claim 5.

8. The XML document processing method according to claim 5, wherein said XML document is an XML document having a multiplicity of formats.

9. The document processing method according to claim 5, wherein said processing is performed with no influence on existing system configurations and implementations of XML processors.

10. A computer program product comprising a computer readable medium having computer readable program code means embodied therein for causing document processing, the computer readable program code means in said computer program product comprising computer readable program code means for causing a computer to effect the functions of:
- a decision rule generation section for generating a decision rule for determining that an XML document, processed in accordance with a simple object access protocol (SOAP) or with an electronic signature, is described in a structured language matches at least one of a plurality of structure type definitions on the basis of, unique indispensable elements or a sequence of elements which exist only in a certain Document Type Definition (DTD), is found from a given particular set of DTDs of the structure type definitions; and
- a determination section for determining that the XML document matches at least one of the structure type definitions on the basis of the decision rule generated by said decision rule generation section and for enabling a particular DTD to which the XML document matches to be determined.

11. An article of manufacture comprising a computer readable medium having computer readable program code means embodied therein for causing document processing of an XML document, processed in accordance with a SOAP or with an electronic signature, is described in a structured language a document described in a structured language using a computer, the computer readable program code means in said article of manufacture comprising computer readable program code means for causing a computer to effect the steps of:
- reading out from a memory a group of given particular structural type definitions to at least one of which the XML document should match;
- generating a decision rule for determining that the XML document corresponds to at least one of structural type definitions included in the group of structural type definitions on the basis of an indispensable element or a sequence of elements, which exist only in a certain Document Type Definition (DTD), is found from a given particular set, of DTDs unique to each of the structural type definitions;
- generating a decision rule for determining that the XML document corresponds to at least one of structural type definitions included in the group of structural definitions on the basis of an element unique to each of the structural type definitions;
- storing the decision rule in the memory; and
- reading out the decision rule from the memory to determine on the basis of the decision rule that the XML document matches at least one of the structural type definitions and enabling a particular DTD to which the XML document matches to be determined.

* * * * *